US011774826B2

(12) United States Patent
Yutani et al.

(10) Patent No.: US 11,774,826 B2
(45) Date of Patent: Oct. 3, 2023

(54) ELECTROCHROMIC ELEMENT AND ELECTROCHROMIC LIGHT CONTROL DEVICE

(71) Applicant: Ricoh Company, Ltd., Tokyo (JP)

(72) Inventors: Keiichiroh Yutani, Kanagawa (JP);
Tohru Yashiro, Kanagawa (JP);
Fuminari Kaneko, Kanagawa (JP);
Tomoo Fukuda, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 161 days.

(21) Appl. No.: 17/371,887

(22) Filed: Jul. 9, 2021

(65) Prior Publication Data

US 2022/0035218 A1 Feb. 3, 2022

(30) Foreign Application Priority Data

Jul. 29, 2020 (JP) .................................. 2020-127956

(51) Int. Cl.
*G02F 1/161* (2006.01)
*G02C 7/10* (2006.01)

(52) U.S. Cl.
CPC ............. *G02F 1/161* (2013.01); *G02C 7/101* (2013.01)

(58) Field of Classification Search
CPC ................................. G02F 1/161; G02C 7/101
See application file for complete search history.

(56) References Cited

U.S. PATENT DOCUMENTS

| 2001/0055143 | A1* | 12/2001 | Ash ........................ B60R 1/088 359/275 |
| 2009/0103036 | A1 | 4/2009 | Onodera et al. |
| 2009/0231663 | A1 | 9/2009 | Hirano et al. |
| 2009/0256157 | A1 | 10/2009 | Kondo et al. |
| 2010/0193775 | A1 | 8/2010 | Yutani et al. |
| 2011/0222139 | A1 | 9/2011 | Naijo et al. |
| 2011/0279884 | A1 | 11/2011 | Fujimura et al. |
| 2012/0033286 | A1 | 2/2012 | Yashiro et al. |
| 2012/0050838 | A1 | 3/2012 | Hirano et al. |
| 2012/0139825 | A1 | 6/2012 | Yashiro et al. |
| 2012/0154892 | A1 | 6/2012 | Yashiro et al. |
| 2012/0194894 | A1 | 8/2012 | Yashiro et al. |

(Continued)

FOREIGN PATENT DOCUMENTS

| JP | 7-175090 | 7/1995 |
| JP | 2017-009843 A | 1/2017 |

(Continued)

OTHER PUBLICATIONS

Extended European Search Report dated Oct. 11, 2021 in European Patent Application No. 21185652.1, 11 pages.

*Primary Examiner* — George G. King
(74) *Attorney, Agent, or Firm* — XSENSUS LLP

(57) ABSTRACT

Provided is an electrochromic element including: a support; an electrochromic layer over the support; an electrolyte layer over the support; and a sealant resin layer in contact with the electrochromic layer at longitudinal ends of the electrochromic layer in a layer lamination direction, wherein the electrochromic layer contains a polymerized product of an oxidatively color-developable electrochromic composition containing a radical-polymerizable compound, and the sealant resin layer contains a thermosetting material.

13 Claims, 6 Drawing Sheets

(56) References Cited

U.S. PATENT DOCUMENTS

| | | |
|---|---|---|
| 2013/0235323 A1* | 9/2013 | Sotzing ............... B01J 19/087 351/44 |
| 2013/0250394 A1 | 9/2013 | Okada et al. |
| 2013/0258439 A1 | 10/2013 | Naijo et al. |
| 2013/0335802 A1 | 12/2013 | Kim et al. |
| 2014/0078569 A1 | 3/2014 | Takahashi et al. |
| 2014/0268284 A1 | 9/2014 | Naijo et al. |
| 2015/0168796 A1 | 6/2015 | Yashiro et al. |
| 2015/0198857 A1 | 7/2015 | Yashiro et al. |
| 2015/0274761 A1 | 10/2015 | Sagisaka et al. |
| 2015/0331295 A1 | 11/2015 | Takahashi et al. |
| 2015/0378233 A1 | 12/2015 | Fujimura et al. |
| 2016/0005375 A1 | 1/2016 | Naijo et al. |
| 2016/0108072 A1 | 4/2016 | Inoue et al. |
| 2016/0209721 A1 | 7/2016 | Matsumoto et al. |
| 2016/0349590 A1 | 12/2016 | Ohshima et al. |
| 2017/0010514 A1 | 1/2017 | Yashiro et al. |
| 2017/0131609 A1 | 5/2017 | Okada et al. |
| 2017/0168366 A1 | 6/2017 | Shinoda et al. |
| 2017/0176833 A1 | 6/2017 | Goto et al. |
| 2017/0226413 A1 | 8/2017 | Goto et al. |
| 2017/0235203 A1 | 8/2017 | Yamamoto et al. |
| 2017/0329197 A1 | 11/2017 | Yashiro et al. |
| 2017/0329198 A1 | 11/2017 | Matsuoka et al. |
| 2017/0329199 A1 | 11/2017 | Yashiro et al. |
| 2018/0017835 A1 | 1/2018 | Kim et al. |
| 2018/0044581 A1 | 2/2018 | Sagisaka et al. |
| 2018/0113366 A1 | 4/2018 | Kaneko et al. |
| 2018/0173070 A1 | 6/2018 | Yamamoto et al. |
| 2018/0231857 A1 | 8/2018 | Kim et al. |
| 2018/0314125 A1 | 11/2018 | Goto et al. |
| 2019/0031694 A1 | 1/2019 | Sagisaka et al. |
| 2019/0184694 A1 | 6/2019 | Yashiro et al. |
| 2019/0227401 A1* | 7/2019 | Yutani ..................... G02F 1/155 |
| 2019/0265569 A1* | 8/2019 | Miyazaki ................ G02F 1/157 |
| 2019/0285960 A1 | 9/2019 | Sasa et al. |
| 2019/0310530 A1 | 10/2019 | Kaneko et al. |
| 2019/0324338 A1 | 10/2019 | Takauji et al. |
| 2020/0089070 A1 | 3/2020 | Yamamoto et al. |
| 2020/0103718 A1 | 4/2020 | Okada et al. |
| 2020/0216478 A1 | 7/2020 | Sagisaka et al. |
| 2020/0301226 A1 | 9/2020 | Yashiro et al. |
| 2020/0301227 A1 | 9/2020 | Takahashi et al. |
| 2020/0301229 A1 | 9/2020 | Yashiro et al. |
| 2020/0409182 A1 | 12/2020 | Endoh et al. |
| 2021/0033939 A1 | 2/2021 | Hasegawa et al. |

FOREIGN PATENT DOCUMENTS

| | | |
|---|---|---|
| JP | 2018-010106 | 1/2018 |
| WO | WO2003/058300 A1 | 7/2003 |

* cited by examiner

COMPARATIVE EXAMPLE

COMPARATIVE EXAMPLE

ELECTROCHROMIC ELEMENT AND ELECTROCHROMIC LIGHT CONTROL DEVICE

CROSS-REFERENCE TO RELATED APPLICATIONS

This patent application is based on and claims priority pursuant to 35 U.S.C. § 119(a) to Japanese Patent Application No. 2020-127956, filed on Jul. 29, 2020 in the Japan Patent Office, the entire disclosure of which is hereby incorporated by reference herein.

BACKGROUND

Technical Field

The present disclosure relates to an electrochromic element and an electrochromic light control device.

Description of the Related Art

Elements that utilize electrochromism, which is a phenomenon that an oxidation-reduction reaction occurs reversibly and transmittance changes reversibly in response to application of a voltage, are electrochromic elements. The electrochromic elements have a high transparency, can realize a high color developing density when developing a color, and are expected to be applied as electrochromic devices combined with driving systems.

Such electrochromic elements can be roughly classified into two types depending on the layer structure. One type has a layer structure in which an electrochromic material and an electrolyte material are mixed. The other type has a layer structure in which an electrochromic material and an electrolyte material are formed as different layers. In the electrochromic elements of the latter type, because the electrochromic material is immobilized, charges injected into the electrochromic layer undergo a backward reaction through an external circuit. Hence, the electrochromic elements of the latter type have a characteristic that once they develop a color, they maintain the color developed state until decolorization drive, and can hence save power consumption.

It is possible to produce a film-shaped electrochromic element using a support formed of a resin. Hence, it is possible to produce an electrochromic element having a bendable or three-dimensional shape.

Light control lenses for eyeglasses are one of the fields to which application of such electrochromic elements is particularly expected. Existing light control lenses for eyeglasses are typically photochromic lenses that develop a color in response to ultraviolet rays. Because color changes occur in response to light, photochromic lenses have problems that users cannot control colors, and the coloring effect degrades or the response time is long in automobiles that block ultraviolet rays.

SUMMARY

According to one aspect of the present disclosure, an electrochromic element includes a support, an electrochromic layer over the support, an electrolyte layer over the support, and a sealant resin layer in contact with the electrochromic layer at longitudinal ends of the electrochromic layer in a layer lamination direction. The electrochromic layer contains a polymerized product of an oxidatively color-developable electrochromic composition containing a radical-polymerizable compound. The sealant resin layer contains a thermosetting material.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
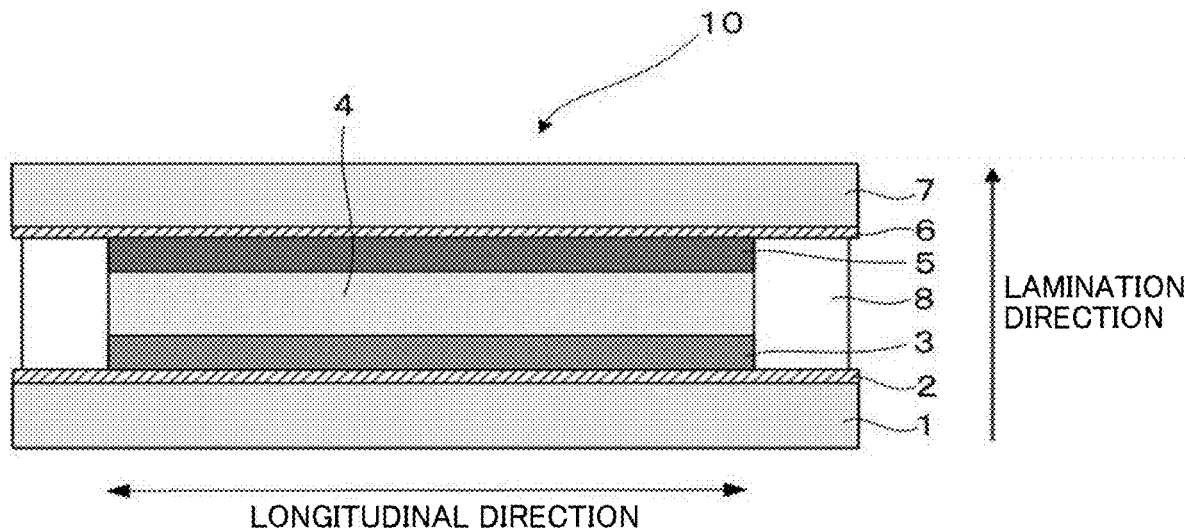
FIG. 1 is a schematic view illustrating an example of an existing electrochromic element.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The present disclosure can provide an electrochromic element that can reduce color development defect of an electrochromic layer and can prevent peeling of a sealant resin layer.

(Electrochromic Element)

An electrochromic element of the present disclosure includes a support, an electrochromic layer, and an electrolyte layer, the electrochromic layer and the electrolyte layer being over the support. The electrochromic layer contains a polymerized product of an oxidatively color-developable electrochromic composition containing a radical-polymerizable compound. The electrochromic element further includes a sealant resin layer that is in contact with the electrochromic layer at longitudinal ends of the electrochromic layer in a layer lamination direction. The sealant resin layer contains a thermosetting material. The electrochromic element further includes other layers as needed.

An electrochromic element is known that includes a support, an electrode for application of a voltage or a current, an electrochromic layer containing an electrochromic material that in response to charge transfer, undergoes an oxidation-reduction reaction to change transmittance reversibly, an electrolyte layer containing an electrolyte material for ion conduction, and a sealant resin layer that bonds supports to each other and suppresses oxygen and moisture outside the element from contacting the electrochromic material and the electrolyte material.

The existing techniques described in Japanese Unexamined Patent Application Publication Nos. 7-175090 and 2018-10106 have problems that the electrochromic elements may deteriorate during operation under the influence of oxygen and moisture in the air, or that the supports bonded to the electrochromic elements may peel from the electrochromic elements under the influence of heat or pressure during thermoforming or formation into a lens shape in the production process. Particularly, for practical use, the sealant resin layer's maintaining its function with as small a width as possible leads to improvement of the marketability. However, a shorter distance (seal width) between the sealant resin layer and the ends of the supports makes the problems described above more obvious because the shorter distance makes the bonding function and the barrier function poorer. There is another problem that when electrochromic layers formed over two opposite electrodes become misaligned, the color developing quality degrades during operation. Moreover, it is difficult to form the longitudinal ends of the electrochromic layers uniform in thickness. This gives rise to a problem that the color developability of the electrochromic layers at the longitudinal ends is unstable.

When electrochromic layers 3 and 5 of an existing electrochromic element 10 illustrated in FIG. 1 are formed by a printing method, defective thickness regions occur at the ends of the electrochromic layers 3 and 5. Therefore, the ends of the electrochromic layers are removed by, for example, laser processing. This increases the production steps and costs, and necessitates highly accurate positioning in order to paste together the substrates over which the electrochromic layers are formed. This problematically makes the takt long.

Figure 2:
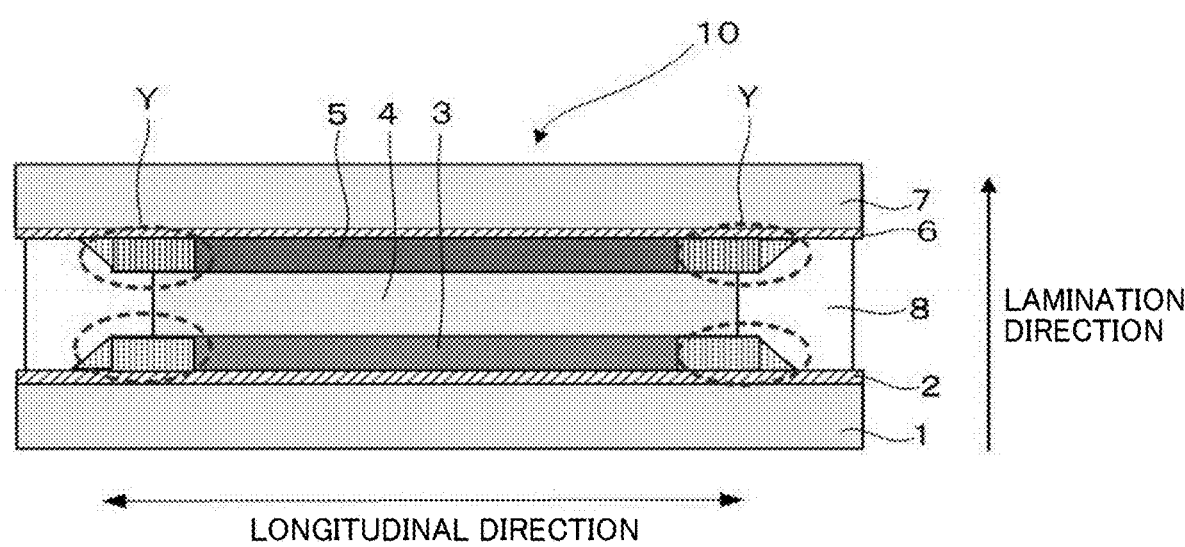
FIG. 2 is a schematic view illustrating another example of an existing electrochromic element.
Figure 3:
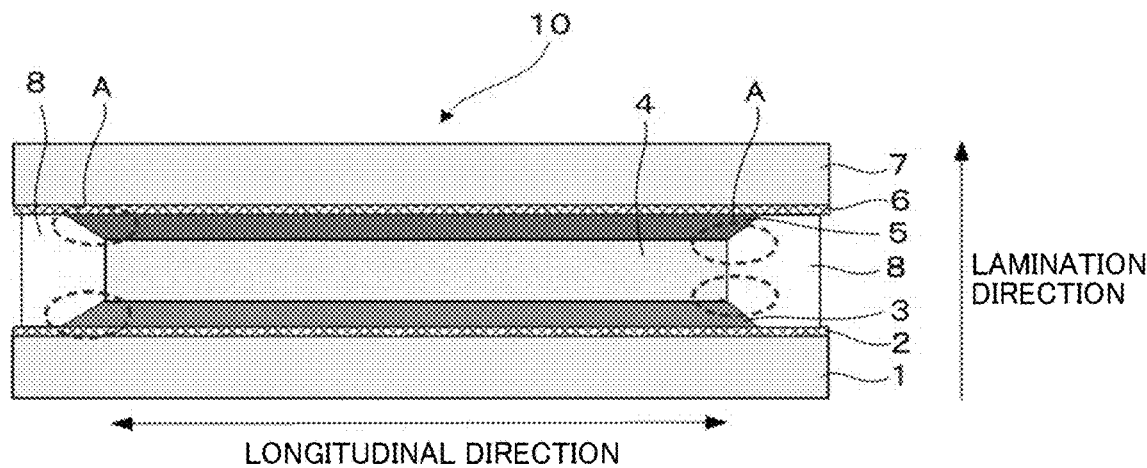
FIG. 3 is a schematic view illustrating an example of an electrochromic element according to an embodiment of the present disclosure.

In the present disclosure, the sealant resin layer containing a thermosetting material having a high peel-proofness contacts the electrochromic layers at the longitudinal ends of the electrochromic layers in the layer lamination direction (see FIG. 3). This makes it possible to reduce peeling of the sealant resin layer. Further, the ends of the electrochromic layers contacted by the sealant resin layer do not develop a color. This makes it possible to suppress color developing density abnormality due to, for example, mispositioning of the ends of the electrochromic layers and film thickness nonuniformity of the electrochromic layers. Moreover, the sealant resin layer contains a thermosetting material containing a thermosetting resin and a thermal curing agent. This makes it possible to suppress color development defect due to contact of the sealant resin layer with the electrochromic layers at the longitudinal ends of the electrochromic layers, and to suppress problems such as peeling of the electrochromic element. This is because the sealant resin layer 8 illustrated in FIG. 2 containing a photo-curable material containing a photopolymerization initiator and a photo-curable resin easily allows radicals, which are produced through irradiation of the photopolymerization initiator with ultraviolet rays, to react with the electrochromic material contained in the electrochromic layers at the ends (regions Y in FIG. 2) of the electrochromic layer, whereas the thermal curing agent contained in the thermosetting material does not cause such a reaction. Therefore, the sealant resin layer containing the thermosetting material can reduce color development defect at the ends of the electrochromic layers. This also makes it possible to suppress problems such as peeling of the electrochromic element.

In one aspect of the present disclosure, it is preferable that an electrochromic element include supports, a first electrode and a second electrode over the supports, and an electrochromic layer and an electrolyte layer between the first electrode and the second electrode, that a sealant resin layer be disposed in a manner to protrude into between the first electrode and the second electrode, and that the electrochromic layer contact the sealant resin layer at longitudinal ends of the electrochromic layer. This makes it possible to stop the ends of the electrochromic layer having an unstable color developability from developing a color, and to prevent peeling of the electrochromic element more effectively.

The protrusion amount of the sealant resin layer means the distance (length) by which the sealant resin layer protrudes into at the maximum, measured from the end surface of the first electrode or the second electrode, and is preferably 0.1 mm or greater and more preferably 0.2 mm or greater but 1 mm or less.

In one aspect of the present disclosure, it is preferable that the electrochromic element include a first electrochromic layer over a first electrode and a second electrochromic layer over a second electrode, and an electrolyte layer between the first electrochromic layer and the second electrochromic layer, and that a sealant resin layer be disposed in a manner to protrude into between the first electrochromic layer and the second electrochromic layer. This makes it possible to stop the ends of the electrochromic layers having an unstable color developability from developing a color, and to prevent peeling of the electrochromic element more effectively.

The protrusion amount of the sealant resin layer is the same as described above.

In one aspect of the present disclosure, the thermosetting material of the sealant resin layer contains an epoxy resin. Use of an epoxy resin as the thermosetting material makes it possible to reduce color development defect of the electrochromic layers and to prevent peeling of the electrochromic element.

In one aspect of the present disclosure, the peel proofness of the sealant resin layer is 1 kgf/cm or greater. Because the sealant resin layer containing a thermosetting material having a high peel proofness contacts the electrochromic layers, it is possible to prevent peeling of the sealant resin layer.

In one aspect of the present disclosure, it is preferable that an electrolyte layer contain a gel electrolyte. In the presence of a liquid electrolyte, the thermal curing agent contained in the thermosetting material before cured may influence color development of the electrochromic layers. Hence, a gel electrolyte used as an electrolyte can suppress diffusion of the thermal curing agent into the electrolyte. This further contributes to reducing color development defect-inducing influence on the electrochromic layers.

In one aspect of the present disclosure, the supports contain at least one selected from polycarbonate resins, polyethylene terephthalate resins, polymethyl methacrylate resins, urethane resins, polyolefin resins, and polyvinyl alcohol resins. This makes the electrochromic element lightweight and bendable, and also makes it possible to thermoform the electrochromic element into a desired shape.

In one aspect of the present disclosure, the support has a desired curvature and includes an optical lens on a surface thereof. This makes it possible to obtain an electrochromic light control lens of which transmittance can be controlled with an electric signal.

Here, an embodiment of the present disclosure will be described with reference to the drawings. In the drawings, the same components will be denoted by the same reference numerals, and may not be described redundantly. FIG. 3 is a schematic view of an electrochromic element 10 according to an embodiment of the present disclosure.

The electrochromic element 10 of FIG. 3 includes a first electrode 2 and a first electrochromic layer 3 sequentially laminated over a first support 1, a second electrode 6 and a second electrochromic layer 5 sequentially laminated over a second support 7, an electrolyte layer 4 formed between the opposite electrodes, and a sealant resin layer 8 sealing the circumference of these layers.

As illustrated in FIG. 3, the sealant resin layer 8 is formed in a manner to contact the electrochromic layers at the longitudinal ends of the electrochromic layers in the layer lamination direction. This enables the electrolyte layer 4 to have a small-area contact or no contact with the first electrode 2 and the second electrode 6. Because the electrolyte layer has an extremely low peel proofness from the electrodes, peel proofness of the electrolyte layer tends to degrade, leading to malfunctioning of the element due to peeling. Hence, peeling is likely to occur due to heat or stress when the electrochromic element is bent or thermoformed. As compared with this, the sealant resin layer has a higher peel proofness than that of the electrolyte layer, making it possible to suppress malfunctioning of the element due to peeling.

However, as a result of earnest studies, the present inventors have found that contact of the sealant resin layer with the longitudinal ends of the electrochromic layers in the layer lamination direction degrades the color developing performance of the electrochromic layers near the regions contacted by the sealant resin layer. Specifically, the sealant resin layer is formed of, for example, a thermosetting material containing a thermosetting resin and a thermal curing agent, or a photo-curable material containing a photo-curable resin and a photopolymerization initiator. It has been found that among these materials, the photopolymerization initiator contained in the photo-curable material produces radicals when irradiated with ultraviolet rays, and the radicals contact and thereby react with the electrochromic material in a color developing state, to make the electrochromic material decolorize or deteriorate.

On the other hand, the thermal curing agent contained in the thermosetting material does not produce radicals and adversely influence color development of the electrochromic material. Moreover, the thermosetting resin having a higher peel proofness than that of the photo-curable resin can improve the peel property and durability of the electrochromic element. Hence, the present disclosure is characterized in that the sealant resin layer contains the thermosetting material.

However, the thermal curing agent contained in the thermosetting material may also diffuse in a liquid electrolyte and induces color development defect of the electrochromic material. Hence, in the present disclosure, it is preferable that the electrolyte layer contain a gel electrolyte. This makes it possible to suppress diffusion of the thermal curing agent contained in the thermosetting material into the electrolyte layer and to prevent color development defect of the electrochromic material.

The components constituting the electrochromic element 10 according to an embodiment of the present disclosure will be described in detail below.

<<First Support and Second Support>>

The first support 1 and the second support 7 have a function of supporting the first electrode 2, the first electrochromic layer 3, the electrolyte layer 4, the second electrochromic layer 5, the second electrode 6, and the sealant resin layer 8.

The first support 1 and the second support 7 are not particularly limited so long as the first support 1 and the second support 7 can support each of these layers, and known thermoformable resin materials may be used as they are.

Examples of the resin materials include, but are not limited to, polycarbonate resins, polyethylene terephthalate resins, polymethyl methacrylate resins, urethane resins, polyolefin resins, and polyvinyl alcohol resins.

When the electrochromic element 10 is a reflective display device that is viewed from the second electrode 6 side, either the first support 1 or the second support 7 needs not be transparent. Moreover, the surfaces of the first support 1 and the second support 7 may be coated with, for example, a transparent insulating layer and an antireflection layer in order to have an improved water vapor barrier property, an improved gas barrier property, and an improved visibility.

The average thickness of the first support 1 and the second support 7 is preferably 0.2 mm or greater but 1.0 mm or less in order to facilitate thermoforming.

<<First Electrode and Second Electrode>>

A transparent conductive oxide material is suitable as the material of the first electrode 2 and the second electrode 6. Examples of the transparent conductive oxide material include, but are not limited to, tin-doped indium oxide (hereinafter, referred to as "ITO"), fluorine-doped tin oxide (hereinafter, referred to as "FTO"), and antimony-doped tin oxide (hereinafter, referred to as "ATO"). Among these materials, an inorganic material containing one selected from indium oxide (hereinafter, referred to as "In oxide"), tin oxide (hereinafter, referred to as "Sn oxide"), and zinc oxide (hereinafter, referred to as "Zn oxide") that are formed by vacuum film formation is preferable.

The In oxide, the Sn oxide, and the Zn oxide are materials that can easily form films by sputtering, and materials having a good transparency and a good electric conductance as well. Among these materials, InSnO, GaZnO, SnO, $In_2O_3$, ZnO, and InZnO are particularly preferable. Moreover, the electrodes having a lower crystallinity are more preferable, because the electrodes having a high crystallinity tend to be broken by thermoforming. From this viewpoint, IZO and AZO of which amorphous films have a high conductivity are preferable. When using these electrode materials, it is preferable to thermoform the materials in a manner that the maximum length of the longer axis of the supports in the curved surfaces of the laminate body after thermoformed is less than or equal to 120%, and more preferably less than or equal to 103% of the maximum length of the longer axis of the supports in the planar surfaces of the laminate body before thermoformed.

Moreover, transparent, conductive metal thin films containing silver, gold, copper, and aluminum, carbon films such as carbon nanotube and graphene, and network electrodes formed of, for example, conductive metals, conductive carbon, and conductive oxides, or combination layers of these films are also effective. The network electrode is obtained by forming, for example, carbon nanotube or other highly conductive non-transmissive materials into a minute network shape to impart transmittance to the materials. The network electrode is preferable because the network electrode tends not to be broken by thermoforming.

Furthermore, it is preferable that the electrodes have a laminate structure of the network electrode with the conductive oxide, or a laminate structure of the conductive metal thin film with the conductive oxide. The laminate structure can make the electrochromic layers develop a color or decolorize uniformly. The conductive oxide layer can also be formed by coating of an ink containing nanoparticles of the conductive oxide. The laminate structure of the conductive metal thin film with the conductive oxide is specifically an electrode that has a thin-film-laminated structure of, for example, ITO/Ag/ITO and has both of conductivity and transparency at the same time.

The thickness of each of the first electrode 2 and the second electrode 6 is adjusted in a manner that an electrical resistance value needed for oxidation-reduction reactions of the first electrochromic layer 3 and the second electrochromic layer 5 can be obtained.

When ITO films are used as the materials of the first electrode 2 and the second electrode 6, the thickness of each of the first electrode 2 and the second electrode 6 is preferably 20 nm or greater but 500 nm or less and more preferably 50 nm or greater but 200 nm or less.

The thickness of the conductive oxide layer when formed by coating of an ink containing nanoparticles of the conductive oxide is preferably 0.2 micrometers or greater but 5 micrometers or less. The thickness of the network electrode is preferably 0.2 micrometers or greater but 5 micrometers or less.

For use as a light control mirror, either the first electrode 2 or the second electrode 6 may have an antireflection function. In this case, the materials of the first electrode 2 and the second electrode 6 may contain metal materials. Examples of the metal materials include, but are not limited to, Pt, Ag, Au, Cr, rhodium, and Al, or alloys of these metal materials, or laminate structures of these metal materials.

Examples of the method for producing each of the first electrode 2 and the second electrode 6 include, but are not limited to, a vacuum vapor deposition method, a sputtering method, and an ion plating method. When the materials of the first electrode 2 and the second electrode 6 are coatable materials, examples of the method include, but are not limited to, a spin coating method, a casting method, a micro gravure coating method, a gravure coating method, a bar coating method, a roll coating method, a wire bar coating method, a dip coating method, a slit coating method, a capillary coating method, a spray coating method, and a nozzle coating method, and various printing methods such as a gravure printing method, a screen printing method, a flexography method, an offset printing method, a reverse printing method, and an inkjet printing method.

<<First Electrochromic Layer and Second Electrochromic Layer>>

The first electrochromic layer 3 and the second electrochromic layer 5 are layers containing an electrochromic material.

The electrochromic material may be any selected from inorganic electrochromic compounds and organic electrochromic compounds. Moreover, conductive polymers known to exhibit electrochromism may also be used.

These electrochromic materials may be appropriately selected for the first electrochromic layer 3 and the second electrochromic layer 5. It is preferable that when an electrochromic material having oxidative color developability is used for one, an electrochromic material having reductive color developability be used for the other.

As the electrochromic material having oxidative color developability, a polymerized product of an oxidatively color-developable electrochromic composition containing a radial-polymerizable compound is preferable, and an electrochromic composition containing a radical-polymerizable compound containing triarylamine is particularly preferable.

<Electrochromic Composition Containing Radical-Polymerizable Compound Containing Triarylamine>

The electrochromic composition containing a radical-polymerizable compound containing tri aryl amine contains a radical-polymerizable compound containing tri aryl amine, preferably contains a radical-polymerizable compound other than the radical-polymerizable compound containing triarylamine and a filler, more preferably contains a polymerization initiator, and further contains other components as needed.

—Radical-Polymerizable Compound Containing Triarylamine—

The radical-polymerizable compound containing triarylamine is important for imparting an electrochromic function having an oxidation-reduction reaction over the surface of an electrode.

Examples of the radial-polymerizable compound containing triarylamine include, but are not limited to, the compound represented by General formula 1 below.

$$A_n\text{-}B_m \quad \text{[General formula 1]}$$

When n=2, m is 0, and two As may contain different substituents, respectively. When n=1, m is 0 or 1. At least either A or B contains a radical-polymerizable functional group. A is the structure represented by General formula 2 below, and binds with B at any of the positions $R_1$ to $R_{15}$. B is the structure represented by General formula 3 below, and binds with A at any of the positions $R_{16}$ to $R_{21}$.

[General formula 2]

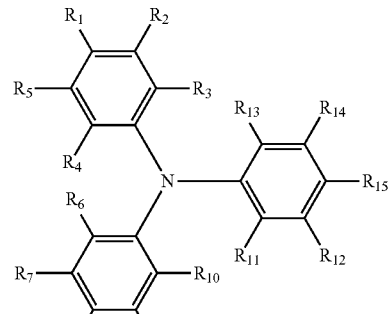

[General formula 3]

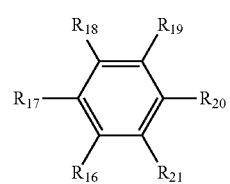

In General formulae 2 and 3, all of $R_1$ to $R_{21}$ are monovalent organic groups that may be the same or different. At least one of the monovalent organic groups is a radical-polymerizable functional group.

—Monovalent Organic Group—

Examples of each independent monovalent organic group in General formula 2 above and General formula 3 above include, but are not limited to, a hydrogen atom, a halogen atom, a hydroxyl group, a nitro group, a cyano group, a carboxyl group, an alkoxycarbonyl group that may contain a substituent, an aryloxycarbonyl group that may contain a substituent, an alkylcarbonyl group that may contain a substituent, an arylcarbonyl group that may contain a substituent, an amide group, a monoalkylaminocarbonyl group that may contain a substituent, a dialkylaminocarbonyl group that may contain a substituent, a monoarylaminocarbonyl group that may contain a substituent, a diarylaminocarbonyl group that may contain a substituent, a sulfonic acid group, an alkoxysulfonyl group that may contain a substituent, an aryloxysulfonyl group that may contain a substituent, an alkylsulfonyl group that may contain a substituent, an arylsulfonyl group that may contain a substituent, an sulfonamide group, a monoalkylaminosulfonyl group that may contain a substituent, a dialkylaminosulfonyl group that may contain a substituent, a monoarylaminosulfonyl group that may contain a substituent, a diarylaminosulfonyl group that may contain a substituent, an amino group, a monoalkylamino group that may contain a substituent, a dialkylamino group that may contain a substituent, an alkyl group that may contain a substituent, an alkenyl group that may contain a substituent, an alkynyl group that may contain a substituent, an aryl group that may a substituent, an alkoxy group that may contain a substituent, an aryloxy group that may contain a substituent, an alkylthio group that may contain a substituent, an arylthio group that may contain a substituent, and a heterocyclic group that may contain a substituent.

Among these examples, an alkyl group, an alkoxy group, a hydrogen atom, an aryl group, an aryloxy group, a halogen group, an alkenyl group, and an alkynyl group are particularly preferable in terms of stable operation and light resistance.

Examples of the halogen atom include, but are not limited to, a fluorine atom, a chlorine atom, a bromine atom, and an iodine atom.

Examples of the alkyl group include, but are not limited to, a methyl group, an ethyl group, a propyl group, and a butyl group.

Examples of the aryl group include, but are not limited to, a phenyl group and a naphthyl group.

Examples of the aralkyl group include, but are not limited to, a benzyl group, a phenethyl group, and a naphthylmethyl group.

Examples of the alkoxy group include, but are not limited to, a methoxy group, an ethoxy group, and a propoxy group.

Examples of the aryloxy group include, but are not limited to, a phenoxy group, a 1-naphthyloxy group, a 2-naphthyloxy group, a 4-methoxyphenoxy group, and a 4-methylphenoxy group.

Examples of the heterocyclic group include, but are not limited to, carbazole, dibenzofuran, dibenzothiophene, oxadiazole, and thiadiazole.

Examples of the substituent that is further substituted for the substituents described above include, but are not limited to, a halogen atom, alkyl groups such as a nitro group, a cyano group, a methyl group, and an ethyl group, alkoxy groups such as a methoxy group and an ethoxy group, aryloxy groups such as a phenoxy group, aryl groups such as a phenyl group and a naphthyl group, and aralkyl groups such as a benzyl group and a phenethyl group.

The radical-polymerizable functional group may be any group so long as it contains a carbon-carbon double bond and has radical polymerizability.

Examples of the radical-polymerizable functional group include, but are not limited to, a 1-substituted ethylene functional group and a 1,1-subsituted ethylene functional group that are presented below.

(1) Examples of the 1-substituted ethylene functional group include, but are not limited to, a functional group represented by General formula (i) below.

$$CH_2=CH—X_1— \qquad \text{General formula (i)}$$

In General formula (i), $X_1$ represents an arylene group that may contain a substituent, an alkenylene group that may contain a substituent, a —CO— group, a —COO— group, a —CON($R_{100}$)— group [where $R_{100}$ represents a hydrogen atom, an alkyl group, an aralkyl group, or an aryl group], or a —S— group.

Examples of the arylene group in General formula (i) above include, but are not limited to, a phenylene group that may contain a substituent, and a naphthylene group.

Examples of the alkenylene group include, but are not limited to, an ethenylene group, a propenylene group, and a butenylene group.

Examples of the alkyl group include, but are not limited to, a methyl group and an ethyl group.

Examples of the aralkyl group include, but are not limited to, a benzyl group, a naphthylmethyl group, and a phenethyl group.

Examples of the aryl group include, but are not limited to, a phenyl group and a naphthyl group.

Specific examples of the radical-polymerizable functional group represented by General formula (i) include, but are not limited to, a vinyl group, a styryl group, a 2-methyl-1,3-butadienyl group, a vinylcarbonyl group, an acryloyl group, an acryloyloxy group, an acryloylamide group, and a vinylthioether group.

(2) Examples of the 1,1-substituted ethylene functional group include, but are not limited to, a functional group represented by General formula (ii) below.

$$CH_2=C(Y)—X_2— \qquad \text{General formula (ii)}$$

In General formula (ii), Y represents an alkyl group that may contain a substituent, an aralkyl group that may contain a substituent, an aryl group that may contain a substituent, a halogen atom, a cyano group, a nitro group, an alkoxy group, and a —COOR$_{101}$ group [where $R_{101}$ represents a hydrogen atom, an alkyl group that may contain a substituent, an aralkyl group that may contain a substituent, an aryl group that may contain a substituent, or CONR$_{102}$R$_{103}$ (where $R_{102}$ and $R_{103}$ represent a hydrogen atom, an alkyl group that may contain a substituent, an aralkyl group that may contain a substituent, or an aryl group that may contain a substituent, and may be the same as or different from each other)]. $X_2$ represents the same substituent as $X_1$ in General formula (i) above, a single bond, and an alkylene group. At least either Y or $X_2$ represents an oxycarbonyl group, a cyano group, an alkenylene group, or an aromatic ring.

Examples of the aryl group in General formula (ii) include, but are not limited to, a phenyl group and a naphthyl group.

Examples of the alkyl group include, but are not limited to, a methyl group and an ethyl group.

Examples of the alkoxy group include, but are not limited to, a methoxy group and an ethoxy group.

Examples of the aralkyl group include, but are not limited to, a benzyl group, a naphthylmethyl group, and a phenethyl group.

Specific examples of the radical-polymerizable functional group represented by General formula (ii) include, but are not limited to, an α-acryloyloxy chloride group, a methacryloyl group, a methacryloyloxy group, an α-cyanoethylene group, an α-cyanoacryloyloxy group, an α-cyanophenylene group, and a methacryloylamino group.

Examples of the substituent that is further substituted for the substituents of $X_1$, $X_2$, and Y include, but are not limited to, a halogen atom, alkyl groups such as a nitro group, a cyano group, a methyl group, and an ethyl group, alkoxy groups such as a methoxy group and an ethoxy group, aryloxy groups such as a phenoxy group, aryl groups such as a phenyl group and a naphthyl group, and aralkyl groups such as a benzyl group and a phenethyl group.

Among the radical-polymerizable functional groups, an acryloyloxy group and a methacryloyloxy group are particularly preferable.

Preferable examples of the radical-polymerizable compound containing triarylamine include, but are not limited to, compounds represented by General formulae (1-1) to (1-3) below.

[General formula 1-1]

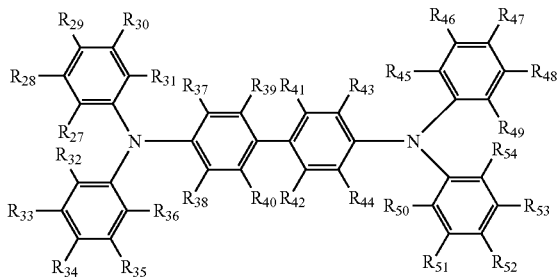

[General formula 1-2]

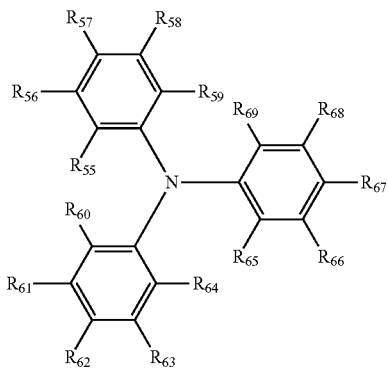

[General formula 1-3]

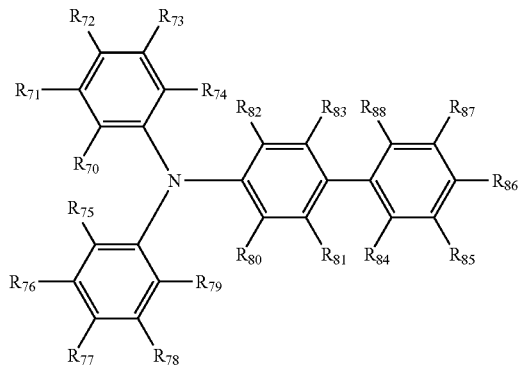

In General formulae (1-1) to (1-3), all of $R_{27}$ to $R_{88}$ represent monovalent organic groups that may be the same or different. At least one of the monovalent organic groups is a radical-polymerizable functional group.

Examples of the monovalent organic groups and the radical-polymerizable functional group include, but are not limited to, the same ones as the groups in General formula (1) above.

Examples of the compound represented by General formula (1) above and General formulae (1-1) to (1-3) above include, but are not limited to, the following example compounds. The radical-polymerizable compound containing triarylamine is not limited to these compounds.

Example Compound 1

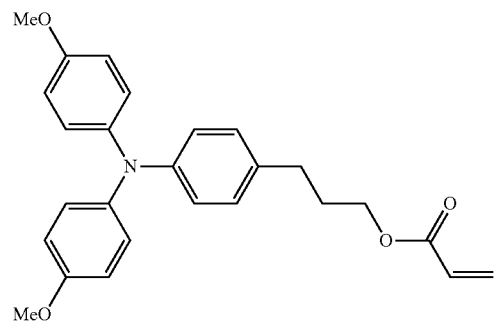 [SMILES: C=CC(=O)OCCCc1ccc(N(c2ccc(OC)cc2)c2ccc(OC)cc2)cc1]

Me represents a methyl group.

Example Compound 2

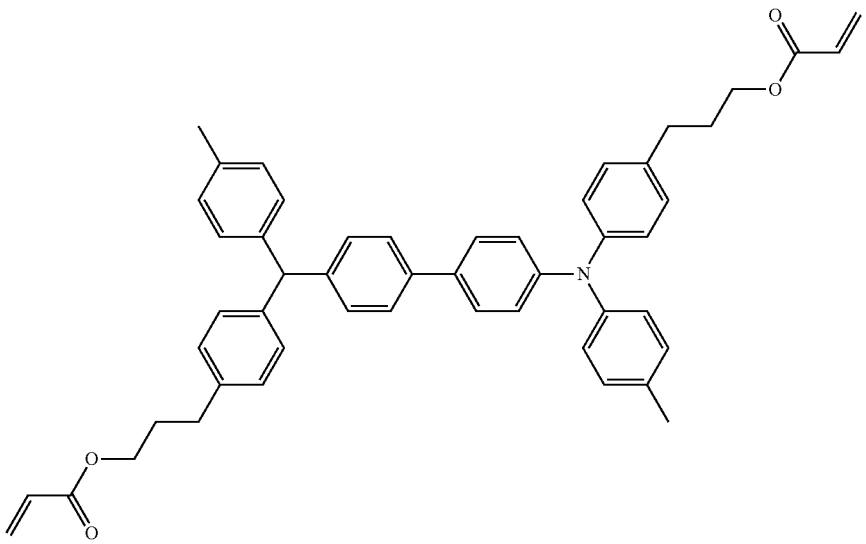 [SMILES: C=CC(=O)OCCCc1ccc(C(c2ccc(C)cc2)c2ccc(-c3ccc(N(c4ccc(C)cc4)c4ccc(CCCOC(=O)C=C)cc4)cc3)cc2)cc1]

Example Compound 3

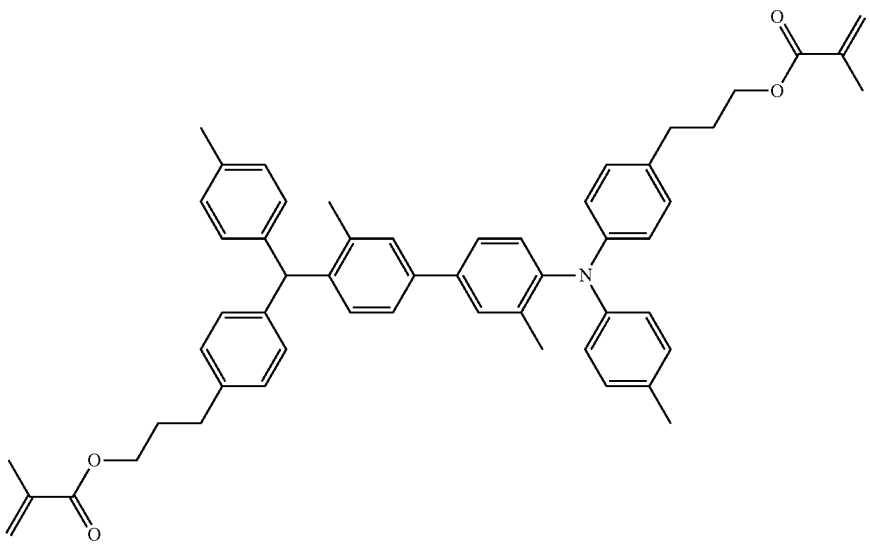 [SMILES: C=C(C)C(=O)OCCCc1ccc(C(c2ccc(C)cc2)c2ccc(-c3ccc(N(c4ccc(C)cc4)c4ccc(CCCOC(=O)C(=C)C)cc4)c(C)c3)cc2C)cc1]

<<Other Radical-Polymerizable Compound>>

Examples of the other radical-polymerizable compound is a compound that is different from the radical-polymerizable compound containing triarylamine and contains at least one radical-polymerizable functional group.

Examples of the other radical-polymerizable compound include, but are not limited to, monofunctional radical-polymerizable compounds, bifunctional radical-polymerizable compounds, trifunctional or higher radical-polymerizable compounds, functional monomers, and radical-polymerizable oligomers. Among these other radical-polymerizable compounds, bifunctional or higher radical-polymerizable compounds are particularly preferable.

Examples of the radical-polymerizable functional group of the other radical-polymerizable compound include, but are not limited to, the same radical-polymerizable functional groups as those in the radical-polymerizable compound containing triarylamine. Among these radical-polymerizable functional groups, an acryloyloxy group and a methacryloyloxy group are particularly preferable.

Examples of the monofunctional radical-polymerizable compound include, but are not limited to, 2-(2-ethoxyethoxy)ethyl acrylate, methoxypolyethylene glycol monoacrylate, methoxypolyethylene glycol monomethacrylate, phenoxypolyethylene glycol acrylate, 2-acryloyloxyethyl succinate, 2-ethylhexyl acrylate, 2-hydroxyethyl acrylate, 2-hydroxypropyl acrylate, tetrahydrofurfuryl acrylate, 2-ethylhexyl carbitol acrylate, 3-methoxybutyl acrylate, benzyl acrylate, cyclohexyl acrylate, isoamyl acrylate, isobutyl acrylate, methoxytriethylene glycol acrylate, phe noxytetraethylene glycol acrylate, cetyl acrylate, isostearyl acrylate, stearyl acrylate, and styrene monomers. One of these monofunctional radical-polymerizable compounds may be used alone or two or more of these monofunctional radical-polymerizable compounds may be used in combination.

Examples of the bifunctional radical-polymerizable compound include, but are not limited to, 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, polyethylene glycol diacrylate, neopentyl glycol diacrylate, EO-modified bisphenol A diacrylate, EO-modified bisphenol F diacrylate, and neopentyl glycol diacrylate. One of these bifunctional radical-polymerizable compounds may be used alone or two or more of these bifunctional radical-polymerizable compounds may be used in combination.

Examples of the trifunctional or higher radical-polymerizable compounds include, but are not limited to, trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloxyethyl)isocyanurate, dipentaerythritol hexaacrylate (DPHA), caprolactone-modified dipentaerythritol hexaacrylate, dipentaerythritol hydroxy pentaacrylate, alkyl-modified dipentaerythritol pentaacrylate, alkyl-modified dipentaerythritol tetraacrylate, alkyl-modified dipentaerythritol triacrylate, dimethylolpropane tetraacrylate (DTMPTA), pentaerythritol ethoxy tetraacrylate, EO-modified phosphoric acid triacrylate, and 2,2,5,5-tetrahydroxymethyl cyclopentanone tetraacrylate. One of these trifunctional or higher radical-polymerizable compounds may be used alone or two or more of these trifunctional or higher radical-polymerizable compounds may be used in combination.

In the foregoing description, "EO-modified" stands for "ethyleneoxy-modified", and "PO-modified" stands for "propyleneoxy-modified".

Examples of the functional monomers include, but are not limited to, monomers in which a fluorine atom is substituted, such as octafluoropentyl acrylate, 2-perfluorooctylethyl acrylate, 2-perfluorooctylethyl methacrylate, and 2-perfluoroisononylethyl acrylate; and vinyl monomers, acrylates, and methacrylates containing from 20 through 70 siloxane repeating units described in JP-5-60503-B and JP-6-45770-B, containing a polysiloxane group such as acryloyl polydimethylsiloxane ethyl, methacryloyl polydimethylsiloxane ethyl, acryloyl polydimethylsiloxane propyl, acryloyl polydimethylsiloxane butyl, and diacryloyl polydimethylsiloxane diethyl. One of these functional monomers may be used alone or two or more of these functional monomers may be used in combination.

Examples of the radical-polymerizable oligomers include, but are not limited to, epoxy acrylate-based oligomers, urethane acrylate-based oligomers, and polyester acrylate-based oligomers.

In terms of forming a cross-linked product, it is preferable that at least either the radical-polymerizable compound containing triarylamine or the radical-polymerizable compound other than the radical-polymerizable compound containing triarylamine contain two or more radical-polymerizable functional groups.

The content of the radical-polymerizable compound containing triarylamine is preferably 10% by mass or greater but 100% by mass or less and more preferably 30% by mass or greater but 90% by mass or less relative to the total amount of the electrochromic composition.

When the content of the radical-polymerizable compound containing triarylamine is 10% by mass or greater, the electrochromic layer can sufficiently express the electrochromic function, has a good durability through repeated use with voltage application, and has a good color developing sensitivity.

The electrochromic function is available even when the content of the radical-polymerizable compound containing triarylamine is 100% by mass. In this case, the color developing sensitivity with respect to the thickness is the maximum. Contrarily, the electrochromic layer may have a reduced compatibility with an ionic liquid needed for charge transfer. This may cause, for example, degradation of durability through repeated use with voltage application, leading to degradation of electric properties. The content of the radical-polymerizable compound containing triarylamine is more preferably 30% by mass or greater but 90% by mass or less considering the balance between the color developing sensitivity and repetition durability, although the content thereof cannot be determined flatly because the electric properties needed vary depending on the processes in which electrochromism is utilized.

<<Polymerization Initiator>>

It is preferable that the electrochromic composition contain a polymerization initiator as needed, in order to efficiently promote a cross-linking reaction between the radical-polymerizable compound containing triarylamine and the radical-polymerizable compound other than the radical-polymerizable compound containing triarylamine.

Examples of the polymerization initiator include, but are not limited to, a thermal polymerization initiator and a photopolymerization initiator. Of these polymerization initiators, a photopolymerization initiator is preferable in terms of polymerization efficiency.

The thermal polymerization initiator is not particularly limited and may be appropriately selected depending on the intended purpose. Examples of the thermal polymerization initiator include, but are not limited to, peroxide-based initiators such as 2,5-dimethylhexane-2,5-dihydroperoxide, dicumyl peroxide, benzoyl peroxide, t-butylcumyl peroxide, 2,5-dimethyl-2,5-di(peroxybenzoyl)hexyne-3, di-t-butyl peroxide, t-butylhydroperoxide, cumene hydroperoxide, and lauroyl peroxide; and azo-based initiators such as azobis isobutylnitrile, azobis cyclohexane carbonitrile, methyl azobis isobutyrate, azobis isobutylamidine hydrochloride, and 4,4'-azobis-4-cyanovaleric acid. One of these thermal polymerization initiators may be used alone or two or more of these thermal polymerization initiators may be used in combination.

The photopolymerization initiator is not particularly limited and may be appropriately selected depending on the intended purpose. Examples of the photopolymerization initiator include, but are not limited to, acetophenone-based or ketal-based photopolymerization initiators such as diethoxyacetophenone, 2,2-dimethoxy-1,2-diphenylethan-1-one, 1-hydroxy-cyclohexyl-phenyl-ketone, 4-(2-hydroxyethoxy)phenyl-(2-hydroxy-2-propyl)ketone, 2-benzyl-2-dimethylamino-1-(4-morpholinophenyl)butanone-1,2-hydroxy-2-methyl-1-phenylpropan-1-one, 2-methyl-2-morpholino(4-methylthiophenyl)propan-1-one, and 1-phenyl-1,2-propanedione-2-(o-ethoxycarbonyl)oxime; benzoin ether-based photopolymerization initiators such as benzoin, benzoin methyl ether, benzoin ethyl ether, benzoin isobutyl ether, and benzoin isopropyl ether; benzophenone-based photopolymerization initiators such as benzophenone, 4-hydroxybenzophenone, methyl o-benzoyl benzoate, 2-benzoyl naphthalene, 4-benzoylbiphenyl, 4-benzoyl phenyl ether, acrylated benzophenone, and 1,4-benzoyl benzene; and thioxanthone-based photopolymerization initiators such as 2-isopropyl thioxanthone, 2-chlorothioxanthone, 2,4-dimethyl thioxanthone, 2,4-diethyl thioxanthone, and 2,4-dichlorothioxanthone. One of these photopolymerization initiators may be used alone or two or more of these photopolymerization initiators may be used in combination.

Examples of other photopolymerization initiators include, but are not limited to, ethyl anthraquinone, 2,4,6-trimethyl-benzoyldiphenylphosphine oxide, 2,4,6-trimethylbenzoylphenylethoxyphosphine oxide, bis(2,4,6-trimethylbenzoyl)phenylphosphine oxide, bis(2,4-dimethoxybenzoyl)-2,4,4-trimethylpentylphosphine oxide, methylphenylglyoxy ester, 9,10-phenanthrene, acridine-based compounds, triazine-based compounds, and imidazole-based compounds. One of these photopolymerization initiators may be used alone or two or more of these photopolymerization initiators may be used in combination.

A substance that has an effect of promoting photopolymerization may be used alone or in combination with the photopolymerization initiator. Examples of the substance include, but are not limited to, triethanolamine, methyl diethanolamine, ethyl 4-dimethylamino benzoate, isoamyl 4-dimethylaminobenzoate, (2-dimethylamino)ethyl benzoate, and 4,4'-dimethylaminobenzophenone.

The content of the polymerization initiator is preferably 0.5 parts by mass or greater but 40 parts by mass or less and more preferably 1 part by mass or greater but 20 parts by mass or less relative to a total amount of 100 parts by mass of the radical-polymerizable compound.

When the radical-polymerizable compound containing triarylamine is formed over the first electrode, it is preferable to form a reductively-reactive color-developable electrochromic material over the second electrode. The reductively-reactive color-developable electrochromic material is not particularly limited and may be appropriately selected from inorganic materials and organic materials.

Examples of the inorganic electrochromic compound include, but are not limited to, tungsten oxide, molybdenum oxide, iridium oxide, and titanium oxide.

Examples of metal complex-based and metal oxide-based electrochromic compounds include, but are not limited to, inorganic electrochromic compounds such as titanium oxide, vanadium oxide, tungsten oxide, indium oxide, iridium oxide, nickel oxide, and Prussian blue.

Examples of the organic electrochromic compound include, but are not limited to, viologen compounds, rare-earth-based phthalocyanine compounds, and styryl compounds.

Examples of the conductive polymers include, but are not limited to, polypyrrole, polythiophene, and polyaniline, or derivatives thereof. Alternatively, it is also possible to impart a polymerizable functional group to monomer molecules of electrochromic compounds described below and irradiate the resultant with ultraviolet rays, to form polymerized films.

Examples of polymer-based and pigment-based electrochromic compounds include, but are not limited to, azobenzene-based, anthraquinone-based, diarylethene-based, dihydroprene-based, dipyridine-based, styryl-based, styrylspiropyran-based, spirooxazine-based, spirothiopyran-based, thioindigo-based, tetrathiafulvalene-based, terephthalic acid-based, triphenylmethane-based, benzidine-based, triphenylamine-based, naphthopyran-based, viologen-based, pyrazoline-based, fenadine-based, phenylenediamine-based, phenoxazine-based, phenothiazine-based, phthalocyanine-based, fluoran-based, fulgide-based, benzopyran-based, and metallocene-based low-molecular-weight organic electrochromic compounds; and conductive polymeric compounds such as polyaniline and polythiophene. One of these polymer-based and pigment-based electrochromic compounds may be used alone or two or more of these polymer-based and pigment-based electrochromic compounds may be used in combination.

As the second electrochromic layer, it is preferable to use a structure of conductive or semiconductor particles carrying an organic electrochromic compound. Specifically, in this structure, particles having a particle diameter of 5 nm or greater but 50 nm or less are bound with the surface of the electrode and an organic electrochromic compound containing a polar group such as phosphonic acid, a carboxyl group, and a silanol group is adsorbed to the surface of the particles.

In this structure, electrons are efficiently injected into the organic electrochromic compound through a high surface effect of the particles. Therefore, the response of this structure is faster than that of existing electrochromic display elements. Moreover, use of particles makes it possible to form a transparent film as a display layer, enabling a high color developing density of the electrochromic compound. The conductive or semiconductor particles may carry a plurality of kinds of organic electrochromic compounds. Furthermore, the conductivity of the conductive particles may double-function as an electrode.

The conductive or semiconductor particles carrying the electrochromic compound are not particularly limited and may be appropriately selected depending on the intended purpose. Metal oxides are preferable.

Examples of the metal oxide material include, but are not limited to, metal oxides that contain as a main component, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicic acid, calcium phosphate, and aluminosilicate. One of these metal oxide materials may be used alone or two or more of these metal oxide materials may be used in combination.

Among these metal oxide materials, at least one selected from titanium oxide, zinc oxide, tin oxide, zirconium oxide, iron oxide, magnesium oxide, indium oxide, and tungsten oxide is preferable in terms of electric properties such as electric conductivity and physical properties such as optical properties, and titanium oxide or tin oxide is particularly preferable because these materials enable color display that has better color-developing or decolorizing response speeds.

The shape of the conductive or semiconductor particles is not particularly limited and may be appropriately selected depending on the intended purpose. In order to efficiently carry the electrochromic compound, a shape having a large surface area per unit volume (hereinafter, referred to as specific surface area) is used. For example, when the particles are aggregates of nanoparticles, the particles have a large specific surface area, and can carry the electrochromic compound more efficiently and make the display contrast ratio between a color developed state and a decolorized state excellent.

It is possible to form the electrochromic layer and the conductive or semiconductor particle layer by vacuum film formation. However, in terms of productivity, it is preferable to form the layers by coating of a particle-dispersed paste.

As the reductively-reactive color-developable electrochromic material, viologen-based compounds and dipyridine-based compounds are preferable. For example, a compound (viologen compound) represented by General formula (1) below is more preferable.

<General formula (I)>

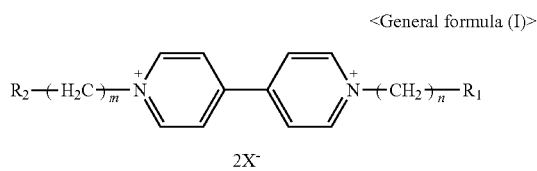

2X$^-$

In General formula (I), $R_1$ and $R_2$ each represent a hydrogen atom, an aryl group containing 14 carbon atoms at the maximum, a heteroaryl group, a branched alkyl group containing ten carbon atoms at the maximum, an alkenyl group, or a functional group that can bind with a cycloalkyl group or a hydroxyl group.

n and m each represent 0, or an integer of from 1 through 10.

X$^-$ represents an ion that neutralizes a charged matter.

In a more preferable aspect, either $R_1$ or $R_2$ is a functional group that can bind with a hydroxyl group.

In this case, the compound can be adsorbed or immobilized to, for example, a transparent electrode (e.g., ITO).

Also when the carrier particles formed of a metal oxide are formed over the transparent electrode, the compound can likewise be adsorbed or immobilized to the transparent electrode advantageously.

In a yet more preferable aspect, both of $R_1$ and $R_2$ are functional groups that can bind with a hydroxyl group.

Examples of the functional group that can bind with a hydroxyl group include, but are not limited to, a phosphonic acid group, a phosphoric acid group, a carboxylic acid group, a sulfonyl group, a silyl group, and a silanol group.

Among these functional groups, a phosphonic acid group, a phosphoric acid group, and a carboxylic acid group are preferable and a phosphonic acid group is more preferable in terms of easy synthesizability, adsorbability to the carrier particles, and stability of the compound.

Examples of the phosphonic acid group include, but are not limited to, a methyl phosphonic acid group, an ethyl phosphonic acid group, a propyl phosphonic acid group, a hexyl phosphonic acid group, an octyl phosphonic acid group, a decyl phosphonic acid group, a dodecyl phosphonic acid group, an octadecyl phosphonic acid group, a benzyl phosphonic acid group, a phenylethyl phosphonic acid group, a phenylpropyl phosphonic acid group, and a biphenyl phosphonic acid group.

Examples of the phosphoric acid group include, but are not limited to, a methyl phosphoric acid group, an ethyl phosphoric acid group, a propyl phosphoric acid group, a hexyl phosphoric acid group, an octyl phosphoric acid group, a decyl phosphoric acid group, a dodecyl phosphoric acid group, an octadecyl phosphoric acid group, a benzyl phosphoric acid group, a phenylethyl phosphoric acid group, a phenylpropyl phosphoric acid group, and a biphenyl phosphoric acid group.

Examples of the carboxylic acid group include, but are not limited to, a methyl carboxylic acid group, an ethyl carboxylic acid group, a propyl carboxylic acid group, a hexyl carboxylic acid group, an octyl carboxylic acid group, a decyl carboxylic acid group, a dodecyl carboxylic acid group, an octadecyl carboxylic acid group, a benzyl carboxylic acid group, a phenylethyl carboxylic acid group, a phenylpropyl carboxylic acid group, a biphenyl carboxylic acid group, a 4-propylphenyl carboxylic acid group, and a 4-propylbiphenyl carboxylic acid group.

Examples of the sulfonyl group include, but are not limited to, a methyl sulfonyl group, an ethyl sulfonyl group, a propyl sulfonyl group, a hexyl sulfonyl group, an octyl sulfonyl group, a decyl sulfonyl group, a dodecyl sulfonyl group, an octadecyl sulfonyl group, a benzyl sulfonyl group, a phenylethyl sulfonyl group, a phenylpropyl sulfonyl group, and a biphenyl sulfonyl group.

Examples of the silyl group include, but are not limited to, a methyl silyl group, an ethyl silyl group, a propyl silyl group, a hexyl silyl group, an octyl silyl group, a decyl silyl group, a dodecyl silyl group, an octadecyl silyl group, a benzyl silyl group, a phenyl ethyl silyl group, a phenylpropyl silyl group, and a biphenyl silyl group.

Examples of the silanol group include, but are not limited to, a methyl silanol group, an ethyl silanol group, a propyl silanol group, a hexyl silanol group, an octyl silanol group, a decyl silanol group, a dodecyl silanol group, an octadecyl silanol group, a benzyl silanol group, a phenylethyl silanol group, a phenylpropyl silanol group, and a biphenyl silanol group.

Each ion X$^-$ that neutralizes a charged matter represents a monovalent anion and is not particularly limited so long as it stably pairs with a cationic moiety. Preferable examples of the ion X$^-$ include, but are not limited to, a Br ion (Br$^-$), a Cl ion (Cl$^-$), an I ion (I$^-$), an OTf (trifluorate) ion (OTf$^-$), a ClO$_4$ ion (ClO$_4^-$), a PF$_6$ ion (PF$_6^-$), and a BF$_4$ ion (BF$_4^-$).

It is preferable that the viologen compound be a symmetric system containing an alkyl chain having a certain length. Here, in General formula (I), it is preferable that m and n both be 4 or greater but 10 or less, and that m and n be the same integer.

Specific examples of the viologen compound include, but are not limited to, the following example compounds. The viologen compound is not limited to these example compounds.

Example Compound A

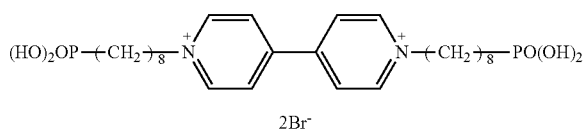

2Br$^-$

Example Compound B

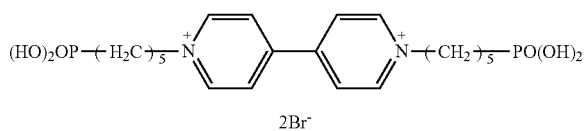

2Br$^-$

Example Compound C

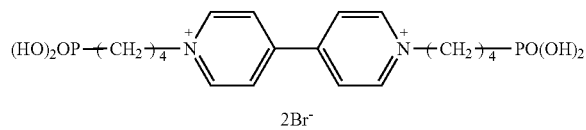

Example Compound I

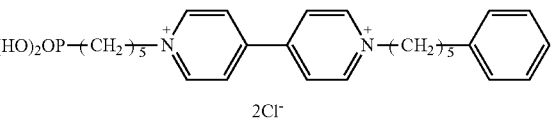

Example Compound D

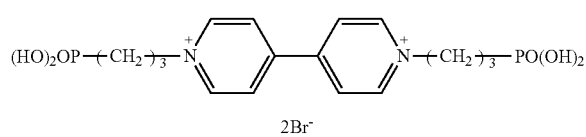

Example Compound J

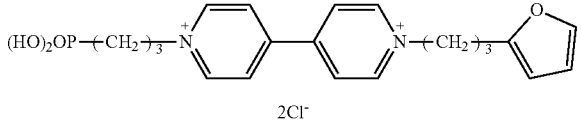

Example Compound E

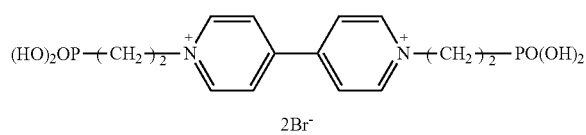

Example Compound K

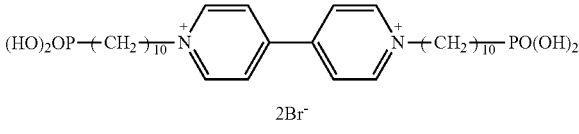

Example Compound F

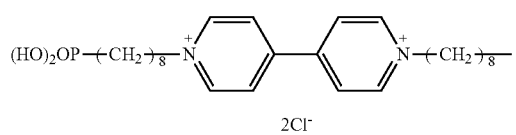

Example Compound G

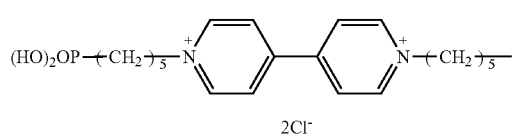

Example Compound H

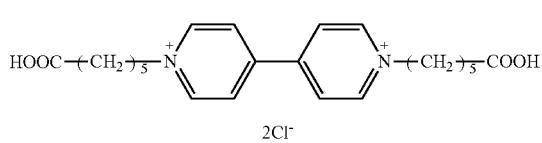

As the method for forming the electrochromic layer, for example, a vacuum vapor deposition method, a sputtering method, and an ion plating method can be used. When the material of the electrochromic layer is a coatable material, examples of the method include, but are not limited to, a spin coating method, a casting method, a micro gravure coating method, a gravure coating method, a bar coating method, a roll coating method, a wire bar coating method, a dip coating method, a slit coating method, a capillary coating method, a spray coating method, and a nozzle coating method, and various printing methods such as a gravure printing method, a screen printing method, a flexography method, an offset printing method, a reverse printing method, and an inkjet printing method.

The average thickness of the electrochromic layer is not particularly limited, may be appropriately selected depending on the intended purpose, and is preferably 0.2 micrometers or greater but 5.0 micrometers or less. An average thickness of the electrochromic layer of 0.2 micrometers or greater but 5.0 micrometers or less is good because an excellent color developing density can be obtained and coloring of the electrochromic layer does not degrade visibility.

<Electrolyte Layer>

The electrolyte layer is not particularly limited so long as the electrolyte layer contains an electrolyte having ionic conductivity. A gel electrolyte is preferable. As compared with use of a liquid electrolyte, use of a gel electrolyte makes it difficult for the thermosetting material contained in the sealant resin layer to elute into the electrolyte layer, and can suppress the thermosetting material from influencing the color-developing action of the electrochromic layer. The gel electrode contains a binder resin and an electrolyte, and further contains a solvent and a polymerization initiator as needed.

The binder resin is not particularly limited and may be appropriately selected depending on the intended purpose. It is preferable that the binder resin contain a urethane resin unit in terms of a phase separation temperature and film strength as a polymerized film. Further, addition of a resin containing a polyethylene oxide (PEO) chain can improve compatibility with the electrolyte and raise the phase separation temperature. Addition of a resin containing a polymethyl methacrylate (PMMA) chain can improve compatibility with the electrolyte and raise the phase separation temperature, like addition of the resin containing a PEO chain.

The gel electrolyte is not particularly limited and may be appropriately selected depending on the intended purpose. Liquid electrolytes such as ionic liquids, or solutions obtained by dissolving solid electrolytes in solvents are used as the gel electrolyte.

The ionic liquid is not particularly limited and may be appropriately selected depending on the intended purpose. Examples of the ionic liquid include, but are not limited to, substances that are liquid at around the temperature of use. The ionic liquid means a liquid resulting from dissolution of a salt and having a liquid state at normal temperature.

Examples of the ionic liquid include, but are not limited to, cations and anions.

Examples of the cations include, but are not limited to, imidazole derivatives such as N,N-dimethyl imidazole salt, N,N-methylethyl imidazole salt, N,N-methylpropyl imidazole salt, N,N-methylbutyl imidazole salt, and N,N-allylbutyl imidazole salt; pyridinium derivatives such as N,N-dimethyl pyridinium salt and N,N-methylpropyl pyridinium salt; pyrrolidinium derivatives such as N,N-dimethyl pyrrolidinium salt, N-ethyl-N-methyl pyrrolidinium salt, N-methyl-N-propyl pyrrolidinium salt, N-butyl-N-methyl pyrrolidinium salt, N-methyl-N-pentyl pyrrolidinium salt, and N-hexyl-N-methyl pyrrolidinium salt; and cations derived from aliphatic quaternary ammonium-based salts such as trimethylpropyl ammonium salt, trimethylhexyl ammonium salt, and triethylhexyl ammonium salt. One of these cations may be used alone or two or more of these cations may be used in combination.

Examples of the anions include, but are not limited to, chlorine anion, bromine anion, iodine anion, $BF_4^-$, $BF_3CF_3^-$, $BF_3C_2F_5^-$, $PF_6^-$, $NO_3^-$, $CF_3CO_2^-$, $CF_3SO_3^-$, $(CF_3SO_2)_2N^-$, $(FSO_2)_2N^-$, $(CF_3SO_2)(FSO_2)N^-$, $(CN)_2N^-$, $(CN)_3C^-$, $(CN)_4B^-$, $(CF_3SO_2)_3C^-$, $(C_2F_5SO_2)_2N^-$, $(C_2F_5)_3PF_3^-$, $AlCl_4^-$, and $Al_2Cl_7^-$. One of these anions may be used alone or two or more of these anions may be used in combination.

Examples of the ionic liquid include, but are not limited to, liquids in which, for example, ethylmethyl imidazolium tetracyanoborate (EMIMTCB, available from Merck KGaA), ethylmethyl imidazolium bistrifluoromethane sulfonimide (EMIMTFSI, available from Kanto Chemical Co., Inc.), ethylmethyl imidazolium tripentafluoroethyl trifluorophosphate (EMIMFAP, available from Merck KGaA), allylbutyl imidazolium tetrafluoroborate (ABIMBF4, available from Kanto Chemical Co., Inc.), and methylpropyl pyrrolidinium bisfluorosulfoneimide (P13FSI, available from Kanto Chemical Co., Inc.) are dissolved. One of these ionic liquids may be used alone or two or more of these ionic liquids may be used in combination.

The content of the ionic liquid is preferably 50% by mass or greater and particularly preferably 80% by mass or greater relative to the total amount of the gel electrolyte. When the content of the ionic liquid is 50% by mass or greater, ionic conductivity can be improved.

As the material of the solid electrolyte, for example, inorganic ion salts such as alkali metal salts and alkali earth metal salts, quaternary ammonium salts, and acid and alkali supporting electrolytes can be used. Specific examples of the material of the solid electrolyte include, but are not limited to, $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$.

<Method for Producing Gel Electrolyte>

It is possible to produce the gel electrolyte by producing a composition solution first, and allowing the produced composition solution to undergo a polymerization reaction by, for example, a cast polymerization method of polymerizing the composition solution inserted between molds or films.

As the composition liquid, the ionic liquid or an electrolytic solution obtained by mixing a solid electrolyte with a solvent, a polymerizable material and a urethane acrylate monomer, and as needed, an acrylate monomer containing a PEO chain, and as needed, an acrylate monomer containing a PMMA chain are mixed at a desired ratio, and the resultant may be mixed with the polymerization initiator and other components as needed.

Examples of the polymerizable material include, but are not limited to, urethane acrylate monomers, acrylate monomers containing a PEO chain, and acrylate monomers containing a PMMA chain.

Examples of the molds include, but art not limited to, glass, containers formed of resins, and films with a release agent. An empty cell of an electrochemical device may be used as a mold and filled with the composition solution, to allow the composition solution to undergo polymerization in the device.

As the polymerization reaction, a radical polymerization reaction is preferable, and a thermal radical polymerization reaction and a photo radical polymerization reaction are more preferable. For radical polymerization, it is preferable to previously deoxidize the composition solution.

Examples of the solvent include, but are not limited to, propylene carbonate, acetonitrile, γ-butyrolactone, ethylene carbonate, sulfolane, dioxolane, tetrahydrofuran, 2-methyl tetrahydrofuran, dimethyl sulfoxide, 1,2-dimethoxyethane, 1,2-ethoxymethoxyethane, polyethylene glycol, and alcohols, or mixture solvents thereof.

The polymerization initiator is not particularly limited and may be appropriately selected depending on the intended purpose. Examples of the polymerization initiator include, but are not limited to, radical polymerization initiators.

Examples of the radical polymerization initiators include, but are not limited to, thermal polymerization initiators and photopolymerization initiators. One of these radical polymerization initiators may be used alone or two or more of these radical polymerization initiators may be used in combination.

Examples of the thermal polymerization initiators include, but are not limited to, azo-compounds such as 2,2'-azobis isobutyronitrile, dimethyl-2,2'-azobis isobutyrate, 2,2'-azobis(2,4-dimethylvaleronitrile), and 2,2'-azobis[2-(2-imidazolin-2-yl)propane]; and organic peroxides such as 2,5-dimethyl-2,5-bis(tert-butylperoxy)hexane and di(4-tert-butylcyclohexyl)peroxy carbonate. One of these thermal polymerization initiators may be used alone or two or more of these thermal polymerization initiators may be used in combination.

Examples of the photopolymerization initiators include, but are not limited to, ketal-based photopolymerization initiators such as 2,2-dimethoxy-1,2-diphenylethan-1-one;

acetophenone-based photopolymerization initiators such as 1-hydroxycyclohexyl phenyl ketone, 2,2-diethoxyacetophenone, 2,2-dimethoxy-2-phenylacetophenone, 4-phenoxydichloroacetophenone, and 4-(t-butyl)dichloroacetophenone; and benzoin ether-based photopolymerization initiators such as benzoin methyl ether, benzoin ethyl ether, benzoin propyl ether, benzoin propyl ether, and benzoin isobutyl ether. One of these photopolymerization initiators may be used alone or two or more of these photopolymerization initiators may be used in combination.

The content of the polymerization initiator is not particularly limited, may be appropriately selected depending on the intended purpose, and is preferably 0.001 parts by mass or greater but 5 parts by mass or less, more preferably 0.01 parts by mass or greater but 2 parts by mass or less, and particularly preferably 0.01 parts by mass or greater but 1 part by mass or less relative to 100 parts by mass of all monomer components.

As another method for producing the gel electrolyte, a method of applying the composition solution before polymerization over the electrochromic layer and polymerizing the composition solution by ultraviolet irradiation or heating may be used.

Moreover, a method of oppositely placing the supports, over which the electrochromic layers are formed, at a gap of 5 micrometers or greater but 150 micrometers or less between the supports, filling the gap with the composition solution, and then polymerizing the composition solution by ultraviolet irradiation or heating may also be used.

<Sealant Resin Layer>

The sealant resin layer 8 is not particularly limited and may be appropriately selected depending on the intended purpose so long as the sealant resin layer 8 serves the function of bonding the supports to each other and suppressing oxygen and moisture in the air from contacting the electrochromic layers. The sealant resin layer contains a thermosetting material and preferably contains an inorganic filler.

The thermosetting material contains a thermosetting resin and a thermal curing agent, and further contains other components as needed.

Examples of the thermosetting resin include, but are not limited to, epoxy resins, melamine resins, urea resins, and unsaturated polyester resins. Among these thermosetting resins, epoxy resins are preferable in terms of peel proofness of the sealant resin layer.

—Epoxy Resin—

The epoxy resin is not particularly limited and may be appropriately selected depending on the intended purpose so long as the epoxy resin is a polymerized product of an epoxy monomer. Examples of the epoxy resin include, but are not limited to, phenol novolac-type epoxy resins, cresol novolac-type epoxy resins, biphenyl novolac-type epoxy resins, tris phenol novolac-type epoxy resins, dicyclopentadiene novolac-type epoxy resins, bisphenol A-type epoxy resins, bisphenol F-type epoxy resins, 2,2'-diallyl bisphenol A-type epoxy resins, bisphenol S-type epoxy resins, hydrogenated bisphenol A-type epoxy resins, propylene oxide-added bisphenol A-type epoxy resins, biphenyl-type epoxy resins, naphthalene-type epoxy resins, resorcinol-type epoxy resins, and glycidylamines. One of these epoxy resins may be used alone or two or more of these epoxy resins may be used in combination.

—Thermal Curing Agent—

The thermal curing agent is not particularly limited and may be appropriately selected depending on the intended purpose so long as the thermal curing agent can cure an epoxy monomer. A thermal curing agent that can cure an epoxy monomer at a temperature of 90 degrees C. or higher but 150 degrees C. or lower is preferable.

It is preferable that the thermal curing agent contain an amine group having an excellent low-temperature reactivity or a thiol group having an excellent low-temperature reactivity, or both. Examples of such a thermal curing agent include, but are not limited to, hydrazide compounds such as 1,3-bis[hydrzinocarbonoethyl-5-isopropylhydantoin], and adipic acid dihydrazide; dicyandiamide, guanidine derivatives, 1-cyanoethyl-2-phenylimidazole, N-[2-(2-methyl-1-imidazolyl)ethyl]urea, 2,4-diamino-6-[2'-methylimidazolyl-(1')]-ethyl-s-triazine, N,N'-bis(2-methyl-1-imidazolylethyl) urea, N,N'-(2-methyl-1-imidazolylethyl)-adipamide, 2-phenyl-4-methyl-5-hydroxymethylimidazole, 2-imidazoline-2-thiol, 2,2'-thiodiethanethiol, and addition products of various amines with epoxy resins.

The content of the thermal curing agent is preferably 0.1 parts by mass or greater but 60 parts by mass or less relative to 100 parts by mass of an epoxy monomer.

Examples of the other components of the thermosetting material include, but are not limited to, a desiccant, and curable resins containing a (meth)acryloyl group.

—Inorganic Filler—

With an inorganic filler, the sealant resin layer can improve barrier properties against oxygen and moisture.

As the inorganic filler, a material having a high insulating property, a high transparency, and a high durability is preferable. Examples of the inorganic filler include, but are not limited to, silicon, aluminum, and zirconia, or mixtures thereof.

—Other Components—

As the other components, for example, a thermal polymerization initiator, a polymerization accelerator, an adhesive aid, and a desiccant may be contained. With an adhesive aid, it is possible to realize a high productivity and a chemical adhesion stability and obtain a highly reliable electrochromic element at low costs.

The peel proofness of the sealant resin layer is preferably 1 kgf/cm or greater, more preferably 1.5 kgf/cm or greater, and yet more preferably 1.8 kgf/cm or greater per a width of 1 cm of the surface to which the sealant resin layer is attached.

The water vapor permeability of the sealant resin layer is preferably 200 $g/m^2/24$ hours or less and more preferably 100 $g/m^2/24$ hours or less at 60 degrees C. at 90% RH.

The transmittance of the sealant resin layer is preferably 50% or higher and more preferably 70% or higher. Color development or decolorization cannot be obtained from the region over which the sealant resin layer is present. Therefore, providing a high transmittance to the region can make this flaw inconspicuous, and can suppress adverse influence on the appearance of the electrochromic element.

The average thickness of the sealant resin layer is not particularly limited, may be appropriately selected depending on the intended purpose, and is preferably 25 micrometers or greater but 150 micrometers or less.

<Optical Lens>

With the electrochromic element of the present disclosure, it is possible to produce an electrochromic light control lens having a light control function, by providing a desired curvature to the support and providing an optical lens on a surface of the support.

The electrochromic light control lens is not particularly limited, may be appropriately selected depending on the intended purpose, and preferably has the following properties.

It is preferable that the refractive index n1 of the support, the reflective index n2 of the optical lens, and the refractive index n3 of the bonding layer satisfy the following formula: n1≤n3≤n2, in terms of mitigation of reflection on the bonding interface, and consequently in terms of transparency.

Alternatively, it is preferable that the refractive index n1 of the support, the reflective index n2 of the optical lens, and the refractive index n3 of the bonding layer satisfy the following formula: n2≤n3≤n1, in terms of mitigation of reflection on the bonding interface, and consequently in terms of transparency.

The refractive indices can be measured with, for example, a multiwavelength Abbe's refractometer (available from Atago Co., Ltd., DR-M2).

It is preferable that the coefficient of linear expansion α1 of the support, the coefficient of linear expansion α2 of the optical lens, and the coefficient of linear expansion α3 of the bonding layer satisfy the following formula: α1≤α3≤α2 in terms of thermal stability and mechanical stability.

It is preferable that the coefficient of linear expansion α1 of the support, the coefficient of linear expansion α2 of the optical lens, and the coefficient of linear expansion α3 of the bonding layer satisfy the following formula: α2≤α3≤α1, in terms of thermal stability and mechanical stability.

The coefficients of linear expansion can be measured with, for example, a TMA device (available from Kobelco Research Institute, Inc.).

It is preferable that the Abbe number v1 of the support and the Abbe number v2 of the optical lens satisfy the following formula: v1≤v2, in terms of mitigation of chromatic aberration.

The Abbe numbers can be measured with, for example, a multiwavelength Abbe's refractometer (available from Atago Co., Ltd., DR-M2).

Figure 5:
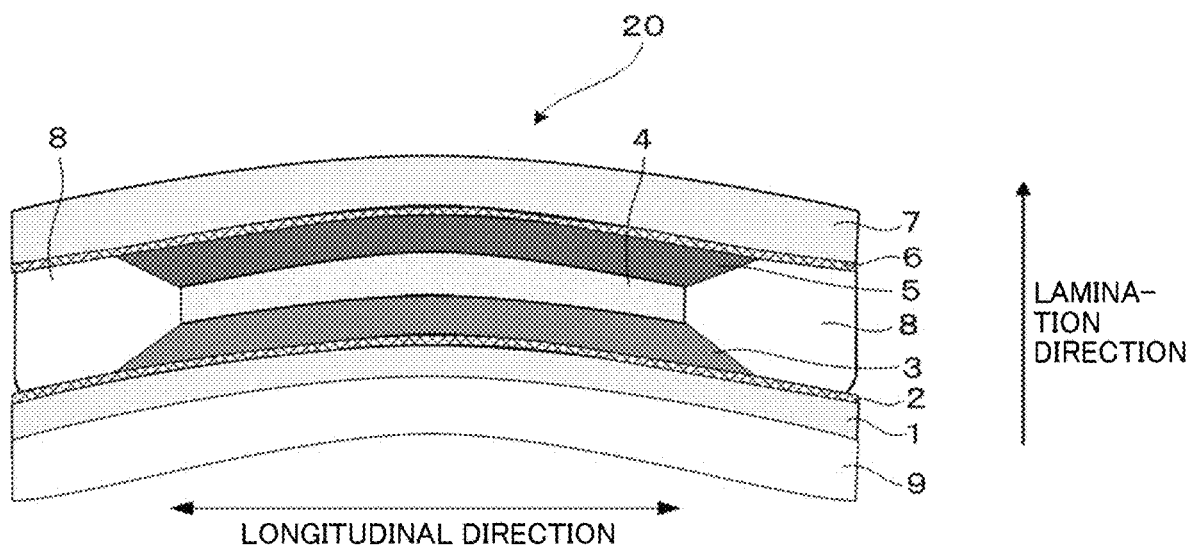
FIG. 5 is a schematic view illustrating an example of an electrochromic element having a 3D spherical shape with which an optical lens is integrally molded.

FIG. 5 is a schematic view illustrating an example of an electrochromic element 20 of a first embodiment after bonding of an optical lens. The electrochromic element 20 of FIG. 5 including an optical lens includes a bonded optical lens 9 on one external surface of the laminate body (electrochromic element 10) and a second support 7 on the other external surface the laminate body.

The material of the optical lens 9 is not particularly limited and may be appropriately selected depending on the intended purpose. Preferable examples of the material of the optical lens 9 include, but are not limited to, transparent materials such as polycarbonate resins, allyl diglycol carbonate resins, diallyl carbonate resins, diallyl phthalate resins, urethane-based resins, thiourethane resins, episulfide resins, methacrylate resins, and cycloolefin resins.

For formation of the optical lens 9 by bonding, the transparent material is brought into contact with one external surface, and is melted and then brought back to a cured state, or is cured by application of light or heat. However, the method of forming the optical lens 9 by bonding is not limited to the method described above.

It is possible to impart an arbitrary diopter to an electrochromic device by setting the curvature radius after cure in consideration of deformation by, for example, cure shrinkage and adjusting at least either the curvature of the light incident surface of the optical lens 9 or the curvature of the light exit surface of the optical lens 9.

After the optical lens 9 is formed, it may be cut into a desired curved surface shape. This enables lens processing (e.g., diopter processing) suited to user-specific conditions. That is, there is no need for preparing molds or parts for each and every product shape, and it is possible to produce a wide variety of highly accurate products in small lots.

(Electrochromic Light Control Device)

An electrochromic light control device of the present disclosure includes the electrochromic element of the present disclosure and further includes other members as needed.

The electrochromic light control device can be suitably used for, for example, electrochromically light-controlled eyeglasses, anti-glare mirrors, and light control glass. Among these applications, electrochromically light-controlled eyeglasses are preferable.

The other members are not particularly limited and may be appropriately selected depending on the intended purpose. Examples of the other members include, but are not limited to, an eyeglass frame, a power source, and a switch.

Figure 9:
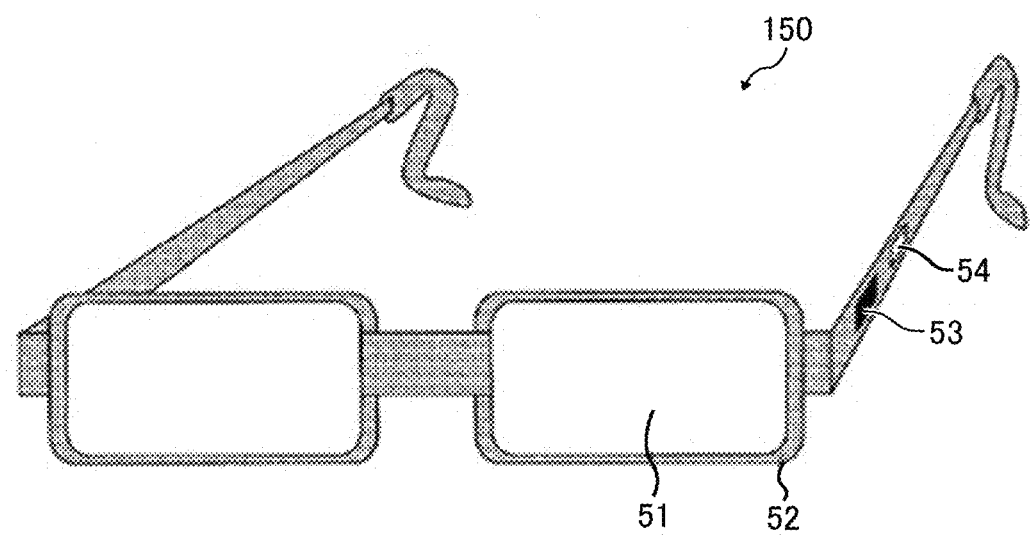
FIG. 9 is a schematic perspective view illustrating an example of an electrochromically light-controlled eyeglasses.

FIG. 9 is a perspective view illustrating an example of a pair of electrochromically light-controlled eyeglasses 150. With reference to FIG. 9, the pair of electrochromically light-controlled eyeglasses 150 includes electrochromic elements 51, an eyeglass frame 52, a switch 53, and a power source 54. The electrochromic elements 51 are the electrochromic elements 10 or 20 of the present disclosure processed into a desired shape.

Two electrochromic elements 51 are incorporated into the eyeglass frame 52. The switch 53 and the power source 54 are provided on the eyeglass frame 52. The power source 54 is electrically connected to a first electrode and a second electrode through an unillustrated wiring via the switch 53.

By toggling the switch 53, it is possible to select one state from, for example, a state of applying a positive voltage, a state of applying a negative voltage, and a state of applying no voltage across the first electrode and the second electrode.

As the switch 53, for example, an arbitrary switch such as a slide switch and a push switch can be used so long as it can switch among at least the three states described above.

As the power source 54, for example, an arbitrary direct-current power source such as a coin cell and a solar cell can be used. The power source 54 can apply a positive or negative voltage of about some volts across the first electrode and the second electrode.

For example, the two electrochromic elements 51 develop a predetermined color in response to application of a positive voltage across the first electrode and the second electrode. The two electrochromic elements 51 decolorize and become transparent in response to application of a negative voltage across the first electrode and the second electrode.

However, depending on the properties of the materials used for the electrochromic layers, the electrochromic layers may develop a color in response to application of a negative voltage across the first electrode and the second electrode, and decolorize and become transparent in response to application of a positive voltage across the first electrode and the second electrode. Once a color is developed, the color developed state continues without application of voltages across the first electrode and the second electrode.

EXAMPLES

The present disclosure will be described below by way of Examples. The present disclosure should not be construed as being limited to these Examples.

Example 1

<Production of Electrochromic Element>
Example 1 illustrates an example of producing an electrochromic element as illustrated in FIG. 3.

—Formation of First Electrochromic Layer—

Next, titanium oxide (obtained from Ishihara Sangyo Kaisha, Ltd., ST-21) (3 g), acetylacetone (0.2 g), a surfactant (obtained from Wako Pure Chemical Industries, Ltd., polyoxyethylene octylphenyl ether) (0.3 g) were treated using a bead mill for 12 hours together with water (5.5 g) and ethanol (1.0 g).

To the obtained dispersion liquid, polyethylene glycol (#20,000, obtained from NOF Corporation) (1.2 g) was added, to produce a paste.

An electron transport layer formed of a porous titanium oxide film was formed by coating of the obtained paste to a thickness of 2 micrometers by a screen printing method, followed by drying at 80 degrees C. and UV ozone treatment at 90 degrees for 20 minutes.

Subsequently, the resultant was coated with a 2,2,3,3-tetrafluoropropanol solution containing a reductively color-developable electrochromic compound of Example compound A in an amount of 1.5% by mass by a spin coating method, followed by annealing treatment at 80 degrees C. for 10 minutes, to make the electrochromic compound be carried (or adsorbed) to the titanium oxide particle film, to form a first electrochromic layer.

—Formation of Second Electrode—

As a second support, a polycarbonate resin substrate having the same shape and thickness as the first support was prepared. An ITO film with a thickness of about 100 nm was deposited over the second support by a sputtering method, to form a second electrode.

—Formation of Second Electrochromic Layer—

A solution in which polyethylene glycol diacrylate (obtained from Nippon Kayaku Co., Ltd., PEG400DA), a photo initiator (obtained from BASF GmbH, IRGACURE 184), Example compound 1, which was an oxidatively color-developable electrochromic material, and 2-butanone were mixed at a mass ratio of (57:3:140:800) was prepared for the ITO second electrode. Subsequently, the ITO glass substrate was coated with the prepared solution by a spin coating method.

Next, in a nitrogen atmosphere, the resultant was UV-cured through a quartz substrate having a Cr layer pattern, to selectively form a patterned second electrochromic layer containing the compound represented by Example compound 1 and having a thickness of 1.2 micrometers over the second electrode.

—Production of Gel Electrolyte—

A releasably treated PET film (NP75C, obtained from Panac Co., Ltd.) was coated with a solution obtained by mixing a polymerizable material (V3877, obtained from Daido Chemical Corporation) and an electrolyte (1-ethyl-3-methyl imidazolium tetracyanoborate (EMIMTCB)) at a mass ratio of (20:80) and mixing a photopolymerization initiator (IRGACURE 184, obtained from Nippon Kayaku Co., Ltd.) in an amount of 0.5% by mass relative to the polymerizable material, and pasted over a releasably treated PET film (NP75A, obtained from Panac Co., Ltd.). The resultant was cured with ultraviolet (UV) rays, to produce a gel electrolyte.

—Pasting Process—

The release films were peeled from the produced gel electrolyte, and the gel electrolyte was pasted over the surface of the first electrochromic layer. Here, the gel electrolyte was shaped into a size slightly smaller than the electrochromic layer pattern to be positioned inward by about 0.5 mm from the circumference. Then, a sealant resin layer was coated over the circumference of the first electrochromic layer by an amount reaching the circumference of the substrate in a manner that the sealant resin layer partially overlapped the electrochromic layer. A thermosetting material 1 (an epoxy resin, PHOTOLEC S, obtained from Sekisui Material Solutions Co., Ltd.) was used for the sealant resin layer and coated by a dispenser method.

Subsequently, the surface of the second electrode over the second support was faced with and pasted over the surface of the gel electrolyte, and the resultant was irradiated with ultraviolet rays by 3 J/cm$^2$ (provisional cure) and thermally cured at 100 degrees C. for one hour (main cure), to produce an electrochromic element of Example 1.

Microscopic observation of the sealant resin layer-formed regions of the obtained electrochromic element of Example 1 revealed that the electrochromic element contacted the sealant resin layer at both ends of the electrochromic layers in the length direction of the electrochromic layers as illustrated in FIG. 3.

Next, the obtained electrochromic element of Example 1 was evaluated in terms of durability, and peel proofness of the sealant resin layer in the manners described below. The results are presented in Table 2.

<Evaluation of Durability>

The obtained electrochromic element of Example 1 was caused to develop a color by application of a voltage of 1.2 V across the first electrode and the second electrode in an environment at 50 degrees C. The transmittance in the color developed state was about 15%. In this state, a 50-hour continuous operation test was performed, and a voltage of 0.6 V was applied as a reverse voltage to cause the electrochromic element to decolorize.

After the test, the device was again caused to develop a color at 1.2 V, and the color developed state was visually observed and evaluated according to the criteria described below.

As a result, an evaluation result "A" was obtained.

[Evaluation Criteria]

A: No color development defect occurred.

B: Color development defect was observed near the sealant resin layer.

<Peel Proofness of Sealant Resin Layer>

A test piece having a width of 10 mm and a length of 100 mm was produced by pasting together, using the thermosetting material 1, two PET films (with an average thickness of 127 micrometers) over which ITO layers were formed, and subjecting the resultant to ultraviolet irradiation and thermal curing in the same manners as in Example 1. Using a digital force gauge obtained from Imada Co., Ltd., one PET film of this test piece was secured to a stage having stiffness, and the other PET film was drawn at an angle of 90 degrees, to measure the strength when the PET film was peeled. The peel proofness of the sample evaluated in this manner was 4 kgf/cm.

Example 2

An electrochromic element was produced in the same manner as in Example 1 except that unlike in Example 1, Example compound 1 of the second electrochromic layer was changed to Example compound 2.

Example 3

An electrochromic element was produced in the same manner as in Example 1 except that unlike in Example 1, Example compound 1 of the second electrochromic layer was changed to Example compound 3.

Example 4

An electrochromic element was produced in the same manner as in Example 1 except that unlike in Example 1, a thermosetting material 2 (an epoxy resin, STRUCT BOND, obtained from Mitsui Chemicals, Inc.) was used for the sealant resin layer.

Example 5

An electrochromic element was produced in the same manner as in Example 4 except that unlike in Example 4, Example compound 1 of the second electrochromic layer was changed to Example compound 2.

Example 6

An electrochromic element was produced in the same manner as in Example 4 except that unlike in Example 4, Example compound 1 of the second electrochromic layer was changed to Example compound 3.

<Performance Evaluation>

Next, the electrochromic elements of Examples 2 to 6 were evaluated in terms of durability in the same manner as in Example 1. As a result, color development defect was not observed from any of the electrochromic elements, and an evaluation result "A" was obtained. Further, the peel proofness of the sealant resin layer of the electrochromic elements was measured in the same manner as in Example 1. The results are presented in Table 2.

Comparative Example 1

An electrochromic element was produced in the same manner as in Example 1 except that unlike in Example 1, a photo-curable material (TB3035B, obtained from Three-Bond Holdings Co., Ltd.) was used for the sealant resin layer.

Comparative Example 2

An electrochromic element was produced in the same manner as in Comparative Example 1 except that unlike in Comparative Example 1, Example compound 1 of the second electrochromic layer was changed to Example compound 2.

Comparative Example 3

An electrochromic element was produced in the same manner as in Comparative Example 1 except that unlike in Comparative Example 1, Example compound 1 of the second electrochromic layer was changed to Example compound 3.

<Performance Evaluation>

Next, the electrochromic elements of Comparative Examples 1 to 3 were evaluated in terms of durability in the same manner as in Example 1. As a result, color development defect was observed from all of the electrochromic elements, and the evaluation result was "B". Further, the peel proofness of the sealant resin layer of the electrochromic elements was measured in the same manner as in Example 1. The results are presented in Table 2.

Example 7

<Production of Electrochromic Light Control Element>
—3D Thermoforming—

Figure 4:
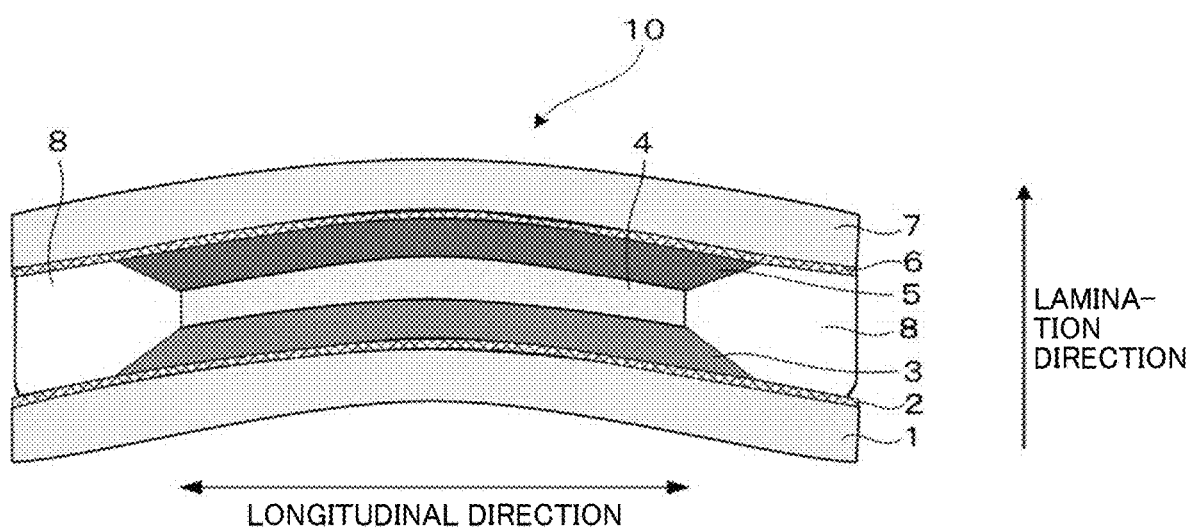
FIG. 4 is a schematic view illustrating an example of an electrochromic element having a 3D spherical shape obtained by thermoforming.

An electrochromic element produced in the same manner as in Example 1 was inserted, while being heated at 135 degrees C., between a convex mold and a concave mold having a curvature radius of about 130 mm, to produce a thermoformed electrochromic element having a 3D spherical shape as illustrated in FIG. 4. The temperature of the molds was set to 146 degrees C. There was a need for setting the temperature of the molds to a temperature close to the softening temperature of each support material. At a temperature lower than the softening temperature, sufficient forming would not be available. At an extremely high temperature, a long time would be needed for cooling and productivity would degrade.

—Formation of Optical Lens—

Figure 6A:
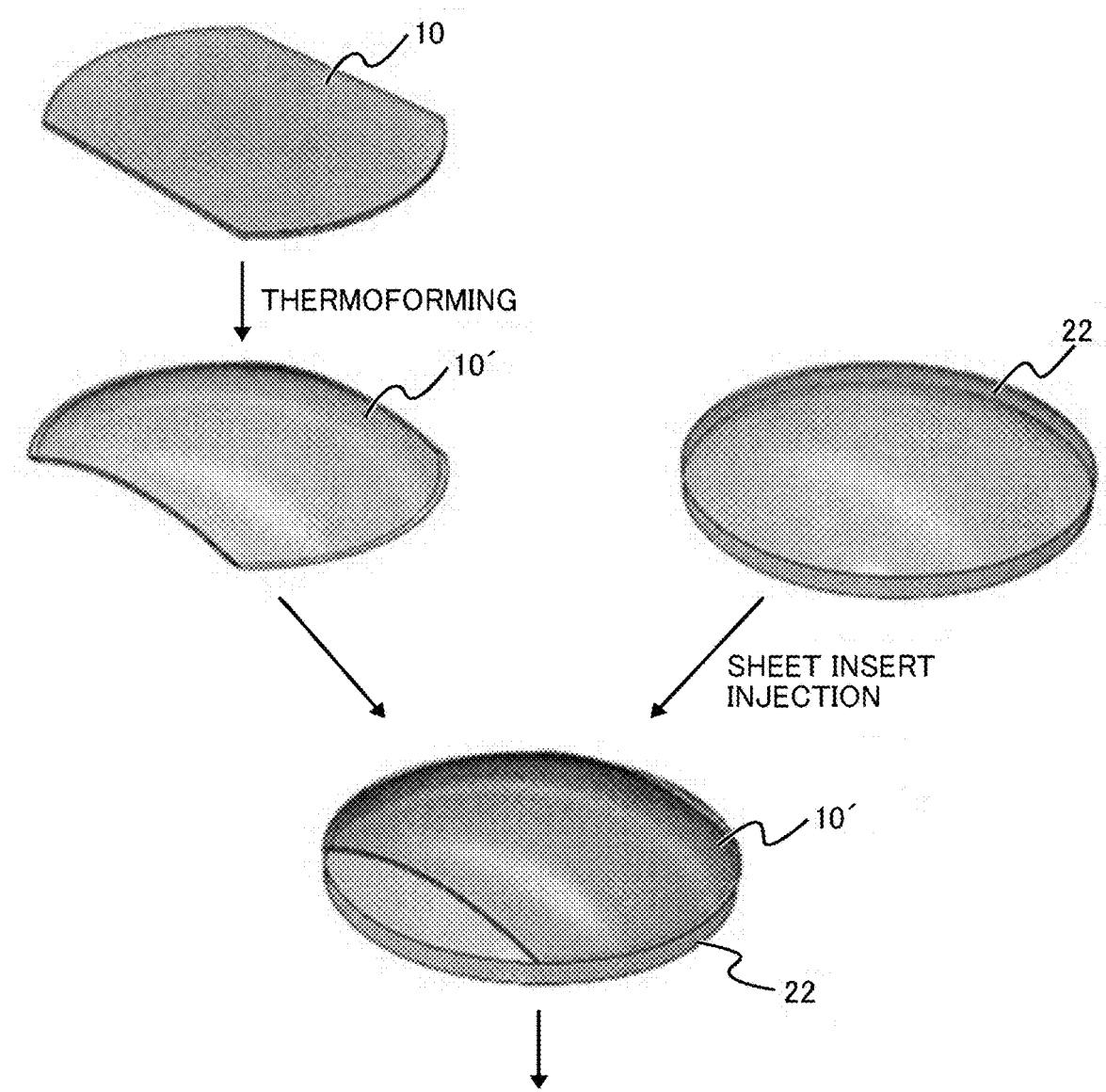
FIG. 6A is a diagram illustrating an example of a method for producing an electrochromic light control lens.
Figure 6B:
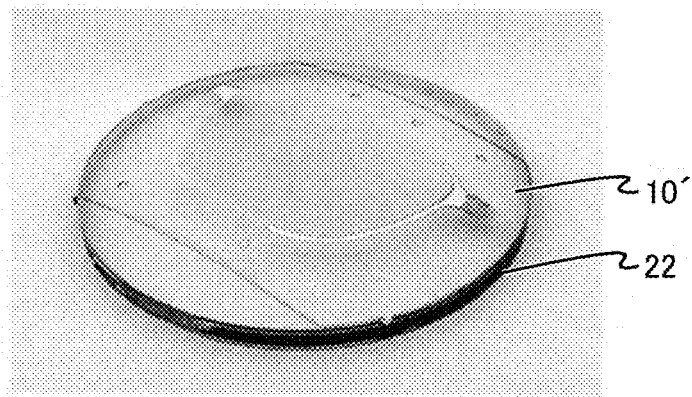
FIG. 6B is a schematic view illustrating an example of an electrochromic light control lens produced.

A polycarbonate resin (IUPILON CLS3400, obtained from Mitsubishi Engineering-Plastic Corporation) was used as the material of an optical lens to be bonded to the thermoformed electrochromic element 10'. The thermoformed electrochromic element 10' was inserted between molds and integrally molded into a lens shape by injection molding (see FIG. 5, FIG. 6A, and FIG. 6B).

Subsequently, the surface of the optical lens 22 portion formed on the electrochromic element 10' by bonding was cut. In this way, a curvature was successfully imparted to the surface of the optical lens 22. Then, the electrochromic element 10' and the optical lens 22 were cut collectively. In this way, the electrochromic element 10' and the optical lens 22 were successfully processed into a size fit to an eyeglass frame. The sealant resin layer-formed regions after cutting were at a position of 2 mm from the ends of the supports.

Next, the electrochromic element over which the optical lens was bonded was evaluated in terms of peel property and durability in the manners described below. As a result, no peeling was observed, and no color development defect was observed in the evaluation of durability. Further, the peel proofness of the sealant resin layer was measured in the same manner as in Example 1. The result is presented in Table 2.

<Peel Property>

The electrochromic element over which the optical lens was bonded was visually observed in terms of presence or absence of peeling, and the peel property was evaluated according to the criteria described below.

[Evaluation Criteria]

A: No visible peeling occurred.

B: Visible peeling occurred.

<Evaluation of Durability>

The electrochromic element over which the optical lens was bonded was caused to develop a color by application of a voltage of 1.2 V across the first electrode and the second electrode in an environment at 50 degrees C. The transmittance in the color developed state was about 15%. In this state, a 50-hour continuous operation test was performed, and a voltage of 0.6 V was applied as a reverse voltage to cause the electrochromic element to decolorize.

After the test, the device was again caused to develop a color at 1.2 V, and the color developed state was visually observed, to evaluate durability according to the criteria described below.

[Evaluation Criteria]

A: No color development defect occurred.

B: Color development defect was observed near the sealant resin layer.

Example 8

An electrochromic element over which an optical lens was bonded was produced in the same manner as in Example 7 except that unlike in Example 7, Example compound 1 of the second electrochromic layer was changed to Example compound 2.

Example 9

An electrochromic element over which an optical lens was bonded was produced in the same manner as in Example 7 except that unlike in Example 7, Example compound 1 of the second electrochromic layer was changed to Example compound 3.

Example 10

An electrochromic element over which an optical lens was bonded was produced in the same manner as in Example 7 except that unlike in Example 7, a thermosetting material 2 (an epoxy resin, STRUCT BOND, obtained from Mitsui Chemicals, Inc.) was used for the sealant resin layer.

Example 11

An electrochromic element over which an optical lens was bonded was produced in the same manner as in Example 10 except that unlike in Example 10, Example compound 1 of the second electrochromic layer was changed to Example compound 2.

Example 12

An electrochromic element over which an optical lens was bonded was produced in the same manner as in Example 10 except that unlike in Example 10, Example compound 1 of the second electrochromic layer was changed to Example compound 3.

<Performance Evaluation>

Next, the electrochromic elements of Examples 8 to 12 were evaluated in terms of durability in the same manner as in Example 7. As a result, color development defect was not observed from any of the electrochromic elements, and the evaluation result was "A". Further, the peel property was evaluated in the same manner as in Example 7 and the peel proofness of the sealant resin layer was measured in the same manner as in Example 7. The results are presented in Table 2.

Comparative Example 4

Figure 7:
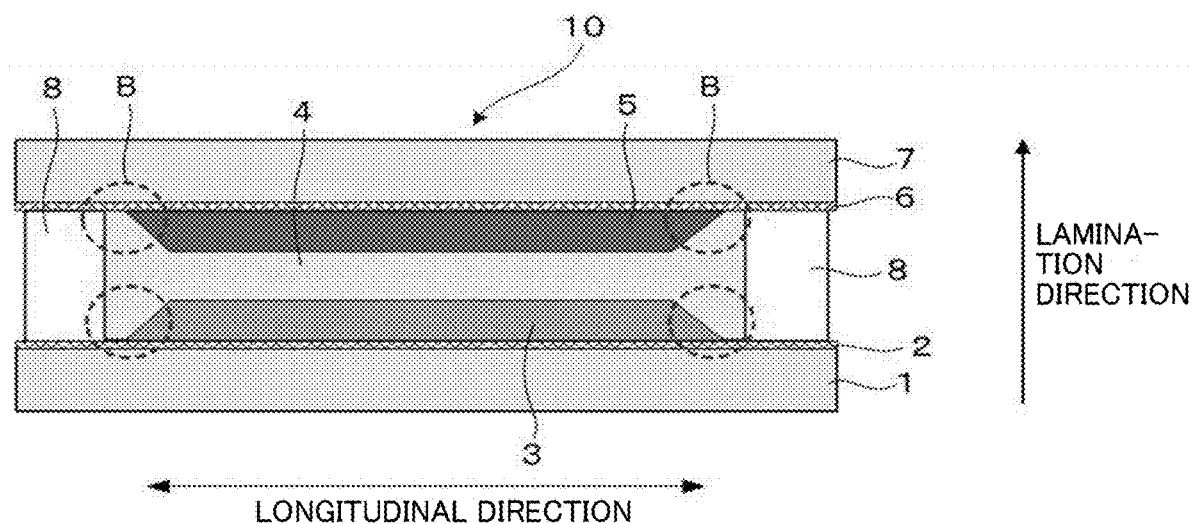
FIG. 7 is a schematic view illustrating an example of an electrochromic element of Comparative Examples 4 and 5.

An electrochromic element over which an optical lens was bonded was produced in the same manner as in Example 7 except that unlike in Example 7, the sealant resin layer was formed so as not to contact the electrochromic layers as illustrated in FIG. 7.

Figure 8:
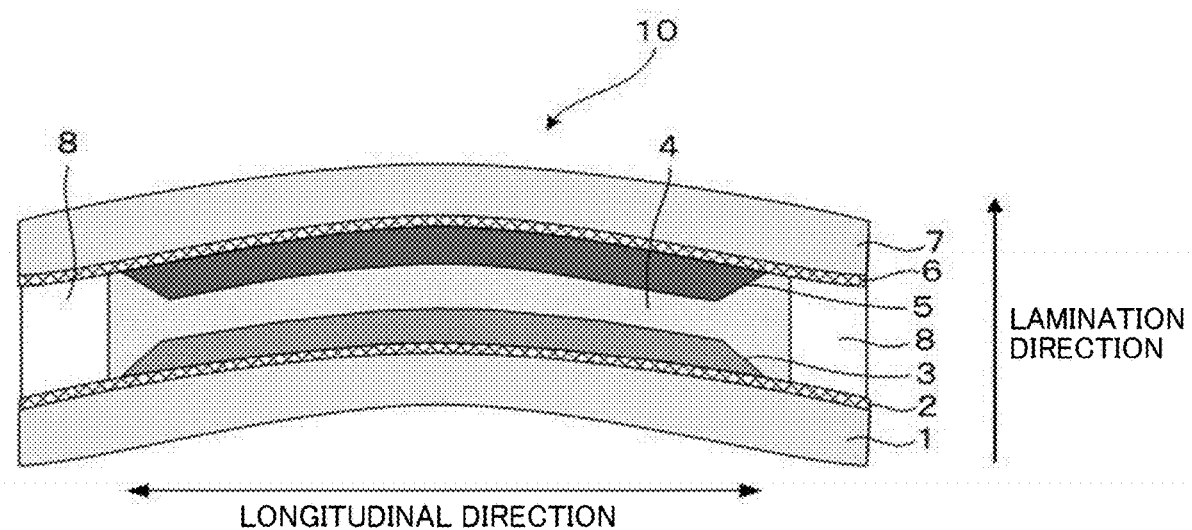
FIG. 8 is a schematic view illustrating a 3D spherical surface-shaped state of the electrochromic element of FIG. 7 obtained by thermoforming.

The produced electrochromic element of Comparative Example 4 was processed by 3D thermoforming as illustrated in FIG. 8. As a result, peeling occurred.

Then, the electrochromic element was caused to develop a color. As a result, color development defect was observed near the sealant resin layer-formed regions. Because the sealant resin layer did not overlap the electrochromic layers, the ends of the printed films of the electrochromic layers could not help but develop a color. Color development defect occurred at the ends of the electrochromic layers due to the influences of the misalignment between the first and second electrochromic layers and nonuniform film thickness at the ends. The peel proofness of the sealant resin layer was measured in the same manner as in Example 7. The result is presented in Table 2.

Comparative Example 5

An electrochromic element of Comparative Example 5 over which an optical lens was bonded was produced in the same manner as in Example 10 except that unlike in Example 10, the sealant resin layer was formed so as not to contact the electrochromic layers as illustrated in FIG. 7.

The produced electrochromic element was processed by 3D thermoforming as illustrated in FIG. 8. As a result, peeling occurred.

Then, the electrochromic element was caused to develop a color. As a result, color development defect was observed near the sealant resin layer-formed regions. Because the sealant resin layer did not overlap the electrochromic layers, the ends of the printed films of the electrochromic layers could not help but develop a color. Color development defect occurred at the ends of the electrochromic layers due to the influences of the misalignment between the first and second electrochromic layers and nonuniform film thickness at the ends. The peel property was evaluated and the peel proofness of the sealant resin layer was measured in the same manner as in Example 7. The result is presented in Table 2.

The layer structures and the evaluation results described above are collectively presented in Table 1 and Table 2. Total evaluation was performed in the manner described below.

<Total Evaluation>

A: For Examples 1 to 6 and Comparative Examples 1 to 3, any Example or Comparative Example that had a durability rating of "A" was rated "A" as total evaluation. For Examples 7 to 12 and Comparative Examples 4 and 5, any Example or Comparative Example that had a durability rating of "A" and a peel property rating of "A" was rated "A" as total evaluation.

B: For Examples 1 to 6 and Comparative Examples 1 to 3, any Example or Comparative Example that had a durability rating of "B" was rated "B" as total evaluation. For Examples 7 to 12 and Comparative Examples 4 and 5, any Example or Comparative Example that had a durability rating of "B" and a peel property rating of "B" was rated "B" as total evaluation.

TABLE 1

| | | Layer structure | | |
| --- | --- | --- | --- | --- |
| | First EC layer | Second EC layer | Sealant resin layer | Structure |
| Ex. 1 | Example compound 1 | Example compound A | Thermosetting material 1 | EC layers and sealant resin layer were in contact |
| Ex. 2 | Example compound 2 | Example compound A | Thermosetting material 1 | EC layers and sealant resin layer were in contact |

TABLE 1-continued

| | Layer structure | | | |
|---|---|---|---|---|
| | First EC layer | Second EC layer | Sealant resin layer | Structure |
| Ex. 3 | Example compound 3 | Example compound A | Thermosetting material 1 | EC layers and sealant resin layer were in contact |
| Ex. 4 | Example compound 1 | Example compound A | Thermosetting material 2 | EC layers and sealant resin layer were in contact |
| Ex. 5 | Example compound 2 | Example compound A | Thermosetting material 2 | EC layers and sealant resin layer were in contact |
| Ex. 6 | Example compound 3 | Example compound A | Thermosetting material 2 | EC layers and sealant resin layer were in contact |
| Comp. Ex. 1 | Example compound 1 | Example compound A | Photo-curable material 1 | EC layers and sealant resin layer were in contact |
| Comp. Ex. 2 | Example compound 2 | Example compound A | Photo-curable material 1 | EC layers and sealant resin layer were in contact |
| Comp. Ex. 3 | Example compound 3 | Example compound A | Photo-curable material 1 | EC layers and sealant resin layer were in contact |
| Ex. 7 | Example compound 1 | Example compound A | Thermosetting material 1 | EC layers and sealant resin layer were in contact |
| Ex. 8 | Example compound 2 | Example compound A | Thermosetting material 1 | EC layers and sealant resin layer were in contact |
| Ex. 9 | Example compound 3 | Example compound A | Thermosetting material 1 | EC layers and sealant resin layer were in contact |
| Ex. 10 | Example compound 1 | Example compound A | Thermosetting material 2 | EC layers and sealant resin layer were in contact |
| Ex. 11 | Example compound 2 | Example compound A | Thermosetting material 2 | EC layers and sealant resin layer were in contact |
| Ex. 12 | Example compound 3 | Example compound A | Thermosetting material 2 | EC layers and sealant resin layer were in contact |
| Comp. Ex. 4 | Example compound 1 | Example compound A | Thermosetting material 1 | EC layers and sealant resin layer were not in contact |
| Comp. Ex. 5 | Example compound 1 | Example compound A | Thermosetting material 2 | EC layers and sealant resin layer were not in contact |

Aspects of the present disclosure are, for example, as follows.

TABLE 2

| | Evaluation result | | | |
|---|---|---|---|---|
| | Peel proofness (kgf/cm) of sealant resin layer | Durability | Peel property | Total evaluation |
| Ex. 1 | 4.0 | A | — | A |
| Ex. 2 | 4.0 | A | — | A |
| Ex. 3 | 4.0 | A | — | A |
| Ex. 4 | 2.1 | A | — | A |
| Ex. 5 | 2.1 | A | — | A |
| Ex. 6 | 2.1 | A | — | A |
| Comp. Ex. 1 | 0.5 | B | — | B |
| Comp. Ex. 2 | 0.5 | B | — | B |
| Comp. Ex. 3 | 0.5 | B | — | B |
| Ex. 7 | 4.0 | A | A | A |
| Ex. 8 | 4.0 | A | A | A |
| Ex. 9 | 4.0 | A | A | A |
| Ex. 10 | 2.1 | A | A | A |
| Ex. 11 | 2.1 | A | A | A |
| Ex. 12 | 2.1 | A | A | A |
| Comp. Ex. 4 | 4.0 | A | B | B |
| Comp. Ex. 5 | 2.1 | A | B | B |

*In Table 2, the peel property evaluation results "—" for Examples 1 to 6 and Comparative Examples 1 to 3 mean that the peel property was not evaluated.

<1> An electrochromic element including:

a support; and an electrochromic layer over the support;

an electrolyte layer over the support; and a sealant resin layer in contact with the electrochromic layer at longitudinal ends of the electrochromic layer in a layer lamination direction, wherein the electrochromic layer comprises a polymerized product of an oxidatively color-developable electrochromic composition comprising a radical-polymerizable compound, and the sealant resin layer comprises a thermosetting material.

<2> The electrochromic element according to <1>, wherein the thermosetting material contains an epoxy resin.

<3> The electrochromic element according to <1> or <2>, wherein peel proofness of the sealant resin layer is 1 kgf/cm or greater.

<4> The electrochromic element according to any one of <1> to <3>, wherein the electrolyte layer contains a gel electrolyte.

<5> The electrochromic element according to any one of <1> to <4>, wherein the supports contain at least one selected from the group consisting of polycarbonate resins, polyethylene terephthalate resins, polymethyl methacrylate resins, polyurethane resins, polyolefin resins, and polyvinyl alcohol resins.

<6> The electrochromic element according to any one of <1> to <5>, wherein the support has a desired curvature and has an optical lens on a surface thereof.

<7> An electrochromic light control device including the electrochromic element according to any one of <1> to <6>.

<8> The electrochromic light control device according to <7>, wherein the electrochromic light control device is a pair of light controlled eyeglasses, a pair of binoculars, a pair of opera glasses, a pair of goggles for a bicycle, a watch, electronic paper, an electronic album, or an electronic billboard.

The electrochromic element according to any one of <1> to <6> and the electrochromic light control device according to <7> or <8> can solve the various problems in the related art and can achieve the object of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An electrochromic element comprising:
   a support;
   a first electrode over the support;
   a first electrochromic layer over the first electrode;
   an electrolyte layer over the first electrochromic layer;
   a second electrochromic layer over the electrolyte layer;
   a second electrode over the second electrochromic layer, and
   a sealant resin layer in contact with the first electrochromic layer and the second electrochromic layer at longitudinal ends of the electrochromic layers in a layer lamination direction,
   wherein the electrochromic layers comprise a polymerized product of an oxidatively color-developable electrochromic composition comprising a radical-polymerizable compound,
   the sealant resin layer comprises a thermosetting material, and
   a width of each of the substrate, the first electrode and the second electrode is larger than a width of each of the first electrochromic layer and the second electrochromic layer, which is larger than a width of the electrolyte layer, and
   the longitudinal ends of the electrochromic layers each have a sloped end surface.

2. The electrochromic element according to claim 1, wherein the thermosetting material comprises an epoxy resin.

3. The electrochromic element according to claim 1, wherein peel proofness of the sealant resin layer is 1 kgf/cm or greater.

4. The electrochromic element according to claim 1, wherein the electrolyte layer comprises a gel electrolyte.

5. The electrochromic element according to claim 1, wherein the support comprises at least one selected from the group consisting of polycarbonate resins, polyethylene terephthalate resins, polymethyl methacrylate resins, polyurethane resins, polyolefin resins, and polyvinyl alcohol resins.

6. The electrochromic element according to claim 1, wherein the support has a desired curvature and comprises an optical lens on a surface thereof.

7. An electrochromic light control device comprising the electrochromic element according to claim 1, and a power source.

8. The electrochromic light control device according to claim 7,
   wherein the electrochromic light control device is a pair of light controlled eyeglasses, a pair of binoculars, a pair of opera glasses, a pair of goggles for a bicycle, a watch, electronic paper, an electronic album, or an electronic billboard.

9. The electrochromic element according to claim 1, wherein the radical-polymerizable compound comprises triarylamine.

10. The electrochromic element according to claim 1, wherein the thermosetting material contains a thermosetting resin and a thermal curing agent, and the thermal curing agent contains an amine group or a thiol group.

11. The electrochromic element according to claim 10, wherein the thermal curing agent comprises at least one selected from the group consisting of 1,3-bis[hydrzinocarbonoethyl-5-isopropylhydantoin], adipic acid dihydrazide, dicyandiamide, guanidine derivatives, 1-cyanoethyl-2-phenylimidazole, N-[2-(2-methyl-1-imidazolyl)ethyl]urea, 2,4-diamino-6-[2'-methylimidazolyl-(1')]-ethyl-s-triazine, N,N'-bis(2-methyl-1-imidazolylethyl)urea, N,N'-(2-methyl-1-imidazolylethyl)-adipamide, 2-phenyl-4-methyl-5-hydroxymethylimidazole, 2-imidazoline-2-thiol, 2,2'-thiodiethanethiol, and addition products of amines with epoxy resins.

12. The electrochromic element according to claim 1, wherein the sealant resin layer is in contact with the electrochromic layers only at the longitudinal ends of the electrochromic layer in the layer lamination direction.

13. The electrochromic element according to claim 1, wherein the sealant resin layer protrudes into between the first electrode and the second electrode, and a protrusion amount of the sealant resin layer is 0.1 mm or greater.

* * * * *